United States Patent
Bartlett et al.

(10) Patent No.: US 10,760,562 B2
(45) Date of Patent: Sep. 1, 2020

(54) PRESSURE BURST FREE HIGH CAPACITY CRYOPUMP

(75) Inventors: Allen J. Bartlett, New London, NH (US); Michael A. Driscoll, Canton, MA (US); Michael J. Eacobacci, Jr., South Attleboro, MA (US); William L. Johnson, Andover, MA (US); Robert P. Sullivan, Townsend, MA (US); Sergei Syssoev, North Andover, MA (US); Mark A. Stira, Wilmington, MA (US); John J. Casello, Norton, MA (US)

(73) Assignee: Edwards Vacuum LLC, Sanborn, NY (US)

(*) Notice: Subject to any disclaimer, the term of this patent is extended or adjusted under 35 U.S.C. 154(b) by 2143 days.

(21) Appl. No.: 12/008,985

(22) Filed: Jan. 15, 2008

(65) Prior Publication Data

US 2008/0168778 A1 Jul. 17, 2008

Related U.S. Application Data

(60) Provisional application No. 60/880,859, filed on Jan. 17, 2007, provisional application No. 60/897,666, filed on Jan. 26, 2007.

(51) Int. Cl.
*F04B 37/08* (2006.01)
*B01D 8/00* (2006.01)

(52) U.S. Cl.
CPC ............ *F04B 37/08* (2013.01); *F04B 37/085* (2013.01); *B01D 8/00* (2013.01)

(58) Field of Classification Search
CPC ........... F04B 37/08; F04B 37/085; B01D 8/00
(Continued)

(56) References Cited

U.S. PATENT DOCUMENTS

| 3,321,927 A | 5/1967 | Hood, Jr. |
| 3,579,998 A | 5/1971 | Thibault et al. |

(Continued)

FOREIGN PATENT DOCUMENTS

| CN | 1828054 A | 9/2006 |
| GB | 2042644 | 9/1980 |

(Continued)

OTHER PUBLICATIONS

International Search Report from International Application No. PCT/US2008/000497, dated Oct. 22, 2008.
(Continued)

*Primary Examiner* — John F Pettitt, III
(74) *Attorney, Agent, or Firm* — Hamilton, Brook, Smith & Reynolds, P.C.

(57) ABSTRACT

A cryopump includes a refrigerator with at least first and second stages. A radiation shield surrounds the second stage and is in thermal contact with the first stage. The radiation shield includes a drain hole to permit cryogenic fluid to traverse through the drain hole during regeneration. The cryopump also includes a primary pumping surface supporting adsorbent in thermal contact with the second stage. The second stage array assembly includes a primary condensing surface, protected surfaces having adsorbent, and non-primary condensing surfaces. A baffle is disposed over the drain hole. The baffle redirects gas from an annular space disposed between the radiation shield and the vacuum vessel that attempts to traverse through the drain hole to prevent the gas from condensing on a non-primary condensing surface. The baffle directs gas to condense on the primary condensing surface.

9 Claims, 18 Drawing Sheets

(58) Field of Classification Search
USPC .................................. 62/55.5, 100; 417/901
See application file for complete search history.

(56) References Cited

U.S. PATENT DOCUMENTS

| | | | |
|---|---|---|---|
| 4,446,702 A * | 5/1984 | Peterson et al. | ............... 62/55.5 |
| 4,555,907 A | 12/1985 | Bartlett | |
| 4,785,666 A * | 11/1988 | Bergquist | ....................... 73/40.7 |
| 5,156,007 A | 10/1992 | Bartlett et al. | |
| 5,228,299 A | 7/1993 | Harrington et al. | |
| 5,465,584 A | 11/1995 | Mattern-Klosson et al. | |
| 5,483,803 A | 1/1996 | Matte et al. | |
| 5,517,823 A | 5/1996 | Andeen et al. | |
| 5,542,257 A | 8/1996 | Mattern-Klosson et al. | |
| 5,782,096 A | 7/1998 | Bartlett et al. | |
| 6,079,928 A | 6/2000 | Theriault et al. | |
| 6,231,289 B1 | 5/2001 | Theriault et al. | |
| 6,309,161 B1 | 10/2001 | Hofmeister | |
| 6,530,732 B1 | 3/2003 | Theriault et al. | |
| 2002/0159864 A1 | 10/2002 | Lowrance | |
| 2007/0012116 A1 | 1/2007 | Arnold et al. | |
| 2007/0022761 A1 * | 2/2007 | Schlenga et al. | .............. 62/51.1 |

FOREIGN PATENT DOCUMENTS

| | | |
|---|---|---|
| JP | 07-502793 | 3/1995 |
| TW | 406162 B | 9/2000 |
| TW | 472113 B | 1/2002 |
| WO | WO 99/37918 | 7/1999 |
| WO | WO 2008/088794 A3 | 7/2008 |

OTHER PUBLICATIONS

LeBaron, H. Todd and Hendrickson, Ruth Ann, "Using Emulation to Validate a Cluster Tool Simulation Model," *Proceedings of the 2000 Winter Simulation Conference,* p. 1417-1422 (2000).
International Search Report from International Application No. PCT/US2008/000497, dated Jan. 30, 2009.

* cited by examiner

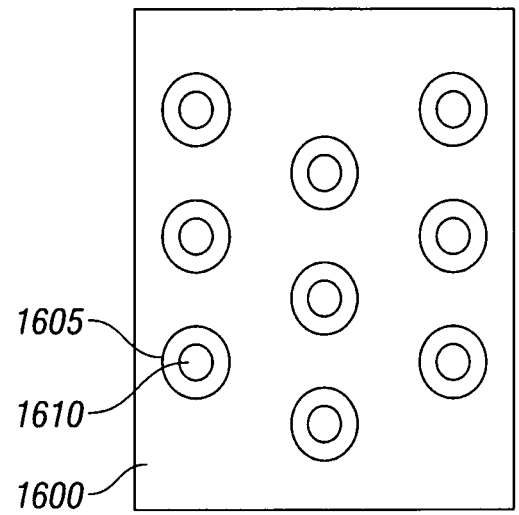 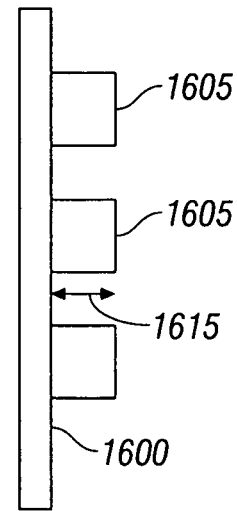
FIG. 16  FIG. 17
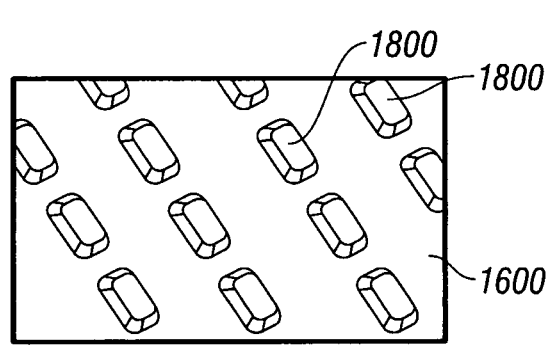 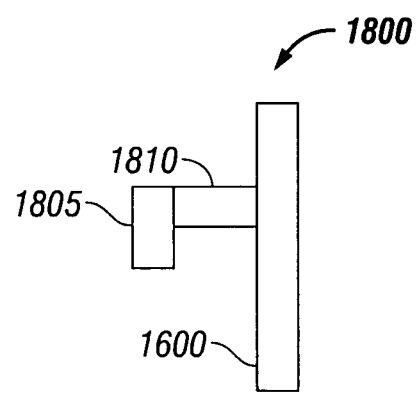
FIG. 18  FIG. 19

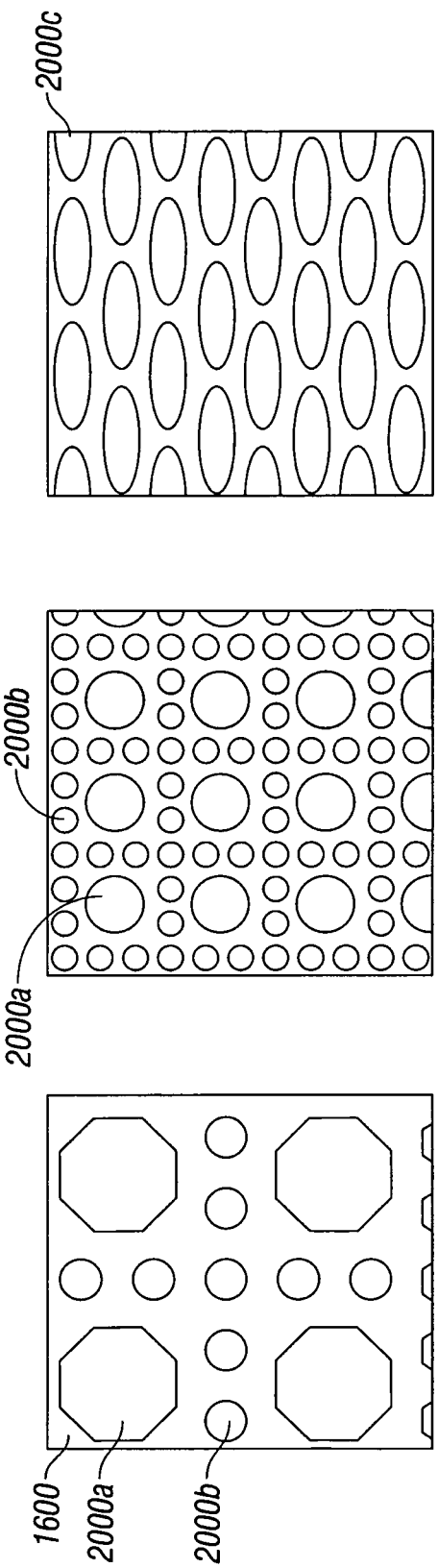
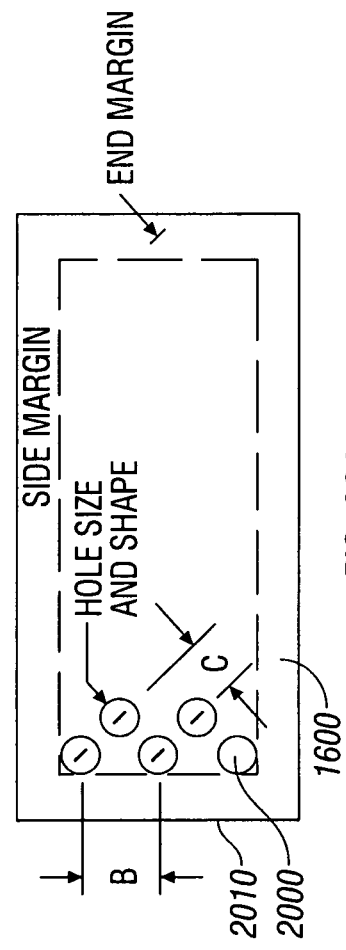
*FIG. 20I*
*FIG. 20H*
*FIG. 20G*
*FIG. 20J*

PRESSURE BURST FREE HIGH CAPACITY CRYOPUMP

CROSS REFERENCE TO RELATED PATENT APPLICATIONS

This application claims priority to U.S. Provisional Patent Application Ser. No. 60/880,859, filed on Jan. 17, 2007 which is herein incorporated by reference in its entirety. This application also claims priority to U.S. Provisional Patent Application Ser. No. 60/897,666, filed on Jan. 26, 2007, which is herein incorporated by reference in its entirety.

BACKGROUND OF THE INVENTION

Cryopumps currently available, whether cooled by open or closed cryogenic cycles, generally follow the same design concept. A low temperature second stage array, usually operating in the range of 4 degrees to 25 degrees Kelvin, is the primary pumping surface. This surface is surrounded by a high temperature cylinder, usually operated in the temperature range of 50 degrees to 130 degrees Kelvin, which provides radiation shielding to the lower temperature array. The radiation shield generally comprises a housing. The housing is closed except at a location near frontal array. The radiation shield is between the primary pumping surface and the chamber to be evacuated. This higher temperature, first stage, frontal array serves as a pumping site for higher boiling point gases such as water vapor.

In operation, high boiling point gases such as water vapor are condensed on the frontal array. Lower boiling point gases pass through that frontal array and pass into the volume within the radiation shield and condense on the second stage array. A surface coated with an adsorbent (such as charcoal or a molecular sieve) operating at or below the temperature of a second stage array may also be provided in this volume. The adsorbent removes or captures the very low boiling point gases. With the gases condensed or adsorbed onto the pumping surfaces, only a vacuum remains in the work chamber.

In systems cooled by closed cycle coolers, the cooler is typically a two stage refrigerator having a cold finger which extends through the radiation shield. The cold end of the second, coldest stage of the refrigerator is at the tip of the cold finger. The primary pumping surface, or cryopanel, is connected to a heat sink at the coldest end of the second stage of the cold finger. This cryopanel may be a simple metal plate, a cup or a cylindrical array of metal baffles arranged around and connected to the second stage heat sink. This second stage cryopanel may also support low temperature adsorbent.

The radiation shield is connected to a heat sink, or heat station at the coldest end of the first stage of the refrigerator. The shield surrounds the first stage cryopanel in such a way as to protect it from radiant heat.

SUMMARY OF THE INVENTION

Condensed residual gases can form on either primary condensing surfaces or non-primary condensing surfaces of the cryopump. Pumping is to take place on the primary pumping surfaces. Primary pumping surfaces include the exterior of the second stage array sets where the type II gas first strikes the array as it enters from the primary opening to the second stage (i.e., the mouth of the radiation shield and through the frontal array). This does not include surfaces of the array plates that are shielded from the first strike of gas from the primary opening. This also does not include the undersides of the array plates, the top of the array plates that have other plates facing them, brackets that are used to attach the plates together, or to the second stage heat station. These surfaces are considered to be non-primary surfaces. Non-primary surfaces can also include, but are not limited to, wires for diodes, or other electrical components that are thermally connected to the second stage, heater cartridges, and the second stage cylinder shield. Gas may enter the second stage pumping region either directly through the frontal array or through secondary openings, which include but are not limited to, drain holes, electrical wire/feed-through holes, purge holes, heaters, and other devices.

The rate of deposition of gas species on the secondary pumping surfaces is significantly lower than on the primary pumping surfaces. This allows a stressed or planar film to form on the secondary array surfaces. The overall structure of the film is planar or sheet-like. The microstructure of the frost is complicated even for a simple binary mixture of pumped gases, widely used in most reactive sputtering applications in the semiconductor industry. Moreover, often the frost is formed from several different types of gases in a layered arrangement depending on what specific material is pumped from the chamber. Various different gases may be pumped from a chamber and the present invention encompassed many different gases and the present invention is not limited to any specific gas.

The condensation on the non-primary condensing surfaces of the cryopump can be subject to an internal tensile stress or to a compressive stress. This stress can be caused from film growth conditions, such as pressure of the gas (arrival rate of the gas), temperature of the gas, or temperature of the surfaces where the gas is deposited and the film's structural defects. On the primary condensing surfaces, the frost generally forms a thick columnar film (more gas molecules), which is distributed on the primary pumping surfaces of the cryoarray.

Notably, the condensation formed on the non-primary condensing surfaces of the cryopump, or the planar film has an internal stress which aggregates over time, and as more film is deposited. As the condensation becomes thicker, stress in the film becomes so great that the planar film will break or fracture and cause flakes, or solid fragments of the condensed gases. These flakes are disfavored.

Once broken, the flakes can then be spontaneously ejected from the non-primary condensing surfaces and fall toward a relative warmer surface of the cryopump, such as a first stage temperature surface. Once the flake is in thermal contact with the relatively warmer surface, the flake can warm and undergo a phase change, or sublimate from a solid phase to a gas phase. Depending on the size of the flake, the gas originating from the sublimated flake can then reenter the pumped chamber, and cause a pressure excursion. These pressure excursions can adversely affect the vacuum conditions within the pumped chamber. The pressure excursion can interrupt manufacturing operations, or can even cause a shut down of the tool in order to perform a regeneration operation to remove all of the condensed gas from the cryopump.

A cryopump includes a refrigerator with at least first and second stages and a radiation shield. The radiation shield surrounds the second stage and is in thermal contact with the first stage. The radiation shield may include a drain hole to permit cryogenic fluid to traverse through the drain hole during regeneration. The cryopump also includes a second stage array supporting adsorbent in thermal contact with the second stage. The second stage array includes primary condensing surfaces, protected surfaces having adsorbent, and non-primary condensing surfaces that do not receive a first strike of the gas that enters the pump. A baffle is disposed over the drain hole. Gas that traverses through the drain hole is redirected either out of the internal volume of the radiation shield or along the inner surface of the shield to prevent the gas from condensing on a non-primary condensing surface. The baffle directs gas to condense on the primary condensing surface. In another embodiment, an occlusion may block a purge hole or an electrical feed through hole to redirect and prevent the gas from condensing on the non-primary condensing surface.

In another embodiment, a cryopump has a refrigerator with at least first and second stages. The second stage includes a cylinder. The cryopump also includes a radiation shield which surrounds the second stage and is in thermal contact with the first stage. A second stage cylinder shield is in thermal contact with the coldest section of the second stage and surrounds the cylinder. A passageway with a uniform temperature differential is formed between the cylinder shield and an extension piece that is in thermal contact with the first stage or in contact with the radiation shield. Molecular collisions with, and condensation on, the cold surface of the cylinder shield are assured to tightly bond the gas molecules to the cylinder shield and to prevent condensation on the second stage refrigerator cylinder.

The cylinder shield includes an end. The end is located adjacent to the extension and the end includes a flare. The flare provides a clearance measured between the extension and the cylinder shield. The clearance is suitable to prevent frost at the end from contacting the extension, and prevents frost from aggregating thereon. Frost that aggregates thereon may break, form flakes, and cause pressure excursion.

According to another aspect of the present disclosure, a cryopump has a refrigerator with at least first and second stages. The cryopump also has a radiation shield which surrounds the second stage and that is in thermal contact with the first stage. The cryopump also has a second stage array supporting adsorbent in thermal contact with the second stage. The second stage array includes a primary condensing surface, protected surfaces having adsorbent, and non-primary condensing surfaces. The non-primary condensing surfaces include surface protrusions formed on a surface where the condensed frost aggregates. The protrusions reduce crack-forming stress in the condensed deposits as gas is deposited on the non-primary condensing surfaces.

In another embodiment, the surface protrusions results in a "low stress" deposited film. The surface protrusions preferably inhibit the formation of a continuous deposited film. In one embodiment, surface protrusions may include a pattern on the non-primary condensing surface. The non-primary condensing surface can include a planar surface with a rough surface texture. This can result from a manufacturing operation, such as a stamping operation manufactured on the planar surface. In an effort to minimize or eliminate gas from pumping to the non-primary surface, a number of gas flow paths are managed in the cryopump.

The cryopump can include that the radiation shield includes a sealed diode hole, or an occlusion generally located to fill where a purge hole is located on the radiation shield. The radiation shield can include a baffle located over the drain hole to redirect gas from the non-primary condensing surface to the primary condensing surface to capture the gas and prevent a pressure excursion. The cryopump may include a surface that forms a non-contiguous film of condensed material as the gas is deposited on the non-primary condensing surface. The primary condensing surface includes a notch to prevent condensation from thermally contacting surfaces in contact with the radiation shield. The surfaces can be about 100 degrees Kelvin. The surface may form a deposited gas film with a non-uniform thickness. The non-uniform film thickness prevents cracking of the deposited film.

According to another embodiment, the cryopump includes a refrigerator having at least first and second stages and a radiation shield which surrounds the second stage, which is in thermal contact with the first stage. The cryopump includes a second stage array supporting adsorbent in thermal contact with the second stage. The second stage array includes a primary condensing surface, protected surfaces having adsorbent, and non-primary condensing surfaces. The primary pumping surface includes a top plate being sectioned into a first section and a second section. The first section and the second section are joined by a rigid connection that prevents relative movement of deposited condensation formed on the first section and the second section.

In one embodiment, the first section and the second section are joined by a bracket. In another embodiment, the first section and the second section are joined by an interlocking interface. The first section and the second section can be also joined by a soldering. The top plate is configured to allow a uniform distribution of frost on a top planar surface of the top plate.

The top plate may also include a notch in a radial side of the top plate. The notch is configured to prevent condensation from contacting an extension, which is about 100 degrees Kelvin, and which is in thermal contact with the radiation shield. The notch can be generally orthogonally shaped. The top plate may also include that the first section overlaps the second section or that the second section overlaps the first section. Alternatively, the top plate is made from three or more sections with the three or more sections being mechanically coupled to one another to inhibit relative motion.

In another embodiment, there is provided a method of managing growth of condensation on a primary pumping surface formed from a first section and a second section of a top plate. The method includes blocking the flow from an annular spaced defined between the vacuum vessel and the radiation shield. The method also has the steps of redirecting the flow to the primary pumping-surface, and condensing the gases at the primary pumping surface to form thick frost. The method also has the step of mechanically coupling the first section and the second section to one another in a rigid manner. The rigid connection prevents condensation, which is deposited on the first section from moving and contacting the condensation deposited on the second section during operation of a pump.

In another embodiment, the cryopump includes a refrigerator having at least first and second stages and a radiation shield which surrounds the second stage and is in thermal contact with the first stage. The cryopump also includes a primary pumping surface supporting adsorbent, which is in thermal contact with the second stage. The primary pumping surface includes a primary condensing surface, protected surfaces having adsorbent, and non-primary condensing surfaces. The cryopump includes at least one of (i) a structure to minimize condensation on the non-primary condensing surfaces (i.e., a baffle, a flare, or an occlusion) and (ii) a second structure to minimize crack-forming stress (i.e., a protrusion or feature) in condensation deposits as gas is deposited on the non-primary condensing surfaces.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 16 and 17 show a top and side view of a surface for reducing crack-forming stress;

FIGS. 18 and 19 show a top and a side view of a surface for reducing crack-forming stress according to another embodiment;

FIGS. 20A through 20I shown several different configurations of a number of surface protrusions for reducing crack-forming stress of the planar film that is deposited on the surface;

FIG. 20J shows a configuration of protrusions disposed on a surface with a margin of space between a lateral edge and the protrusions.

DETAILED DESCRIPTION OF THE INVENTION

Figure 1:
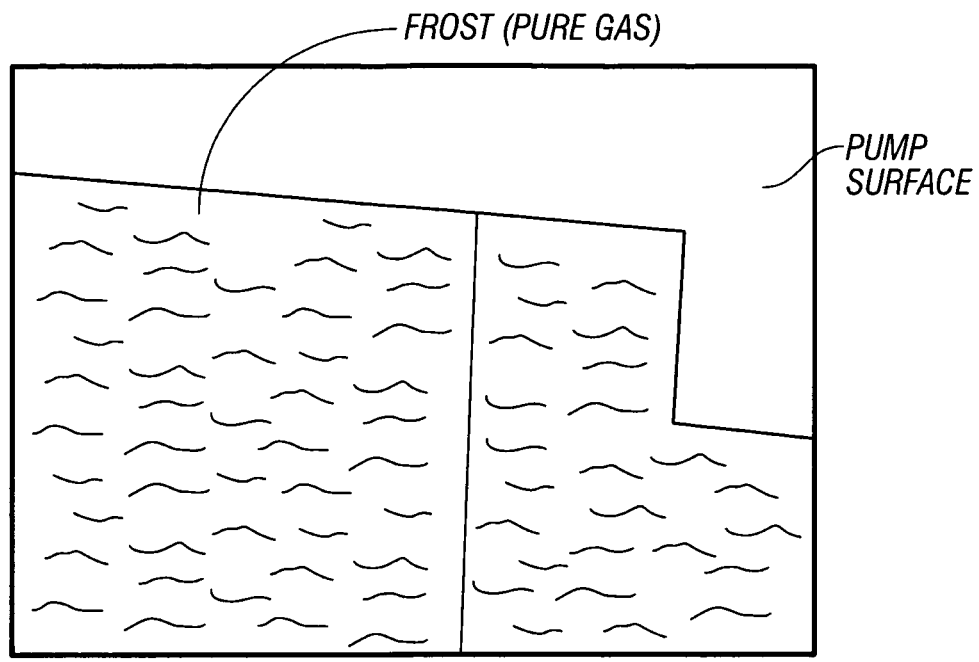
FIG. 1 shows a thin film deposition for a pure condensed gas on a non-primary condensing surface of the cryopump with the condensed material showing some cracking of the film into flakes.

A description of example embodiments of the invention follows.

There exist two types of condensed frost films that forms on surfaces of the cryopump 10, a thick columnar shaped frost and a thin planar film. Turning now to FIGS. 5B and 5C, the columnar shaped frost (which is omitted from FIGS. 5B and 5C) may be formed on a primary condensing surface 15 of an array 20, while the planar film can be formed other non-primary condensing portions of a cryopump 10 (FIG. 5B). In one embodiment, the planar film may form on a bracket 25 positioned under the top plate 20 (FIG. 5B) of the array 10. This bracket 25 is a non-primary condensing surface 25 (FIG. 5B). Turning to FIG. 5D, gas may enter an annular space 35 that is located between a vacuum vessel 30 and a radiation shield 40. As shown in FIG. 5D, the gas will pass in to the annular space 35 in the direction of arrows A, B, and C instead of flowing to the top plate 15 of the array. The gas will then pass through a drain hole opening 45 that is located in the radiation shield 40 in the direction of reference arrow D.

A planar frost film can be formed by gas passing between the vacuum vessel 30 and the radiation shield 40 (FIG. 5B). The gas passes into an annular space 35 formed between vessel 30 and space 35 in the direction of reference arrow D. This gas can then move from the drain hole 45 and condense on the bracket 25 (FIG. 5C) or in zones other than the primary condensing surface 15 shown in FIG. 5B. The gas, although successfully condensing on these surfaces (such as the bracket 25 or other locations) is not desired since the condensed material forms a high-stress planar film. This type of condensed gas can form in a structure that can affect operation of the cryopump 10 over time and cause pressure excursions into a vacuum chamber.

The columnar frost deposits F (shown in FIG. 7B) are observed as a thick structure that forms on the primary condensing surface 15 of the array 20, which is favored (FIG. 5B). While the planar frost film is formed, for example, on the bracket 25, (FIG. 5C) the film can undergo cracking, delamination, and ejection with subsequent sublimation on warmer surfaces. This sublimation can cause gases to reenter a vacuum chamber, such as a process module or transfer chamber, and affect the vacuum conditions in the chamber, which is undesirable. Contact of these frost flakes with a warm surface of the cryopump can lead to pressure excursions that may cause interruption of manufacturing operations in the transfer chamber or process chamber, or can cause the manufacturer to cease operations in favor of warming the pump in a subsequent regeneration operation. Both are disfavored as the manufacturer would desire to avoid pressure excursions entirely.

The formation of this stressed planar frost film can occur while pumping either one pure gas or gas mixtures. During condensation of a gas on a cold surface a number of different structures or phases can be formed such as, for example, hexagonal closed packed, and face centered cubic. For example, a mixture of about seventy percent Argon and thirty percent of Nitrogen at ten degrees Kelvin will form face centered cubic structure, while sixty percent of Nitrogen and forty percent Argon at this same temperature will form a hexagonal close packed phase. Thin planar frost film may form with internal stress and, as the condensed film deposits and becomes thicker on a surface, the film can undergo cracking over time. This cracking and subsequent spalling (or feature where the chips are shed from a contact point) are attributed to the residual tensile or compressive stress formed in the layered planar film.

There is an influence of a substrate temperature and a gas pressure on microstructure development in metallic coatings, which is analogous to frost development on the primary condensing surface 15 and non-primary condensing surface 25 of the cryopump 10 (FIGS. 5B to 5D). The microstructure of the frost will depend on parameters including (i) a temperature of the gas, (ii) a temperature of the deposited surface (a substrate temperature), and (iii) a rate of introduction of the gas onto the deposited surface (pressure).

Figure 7A:
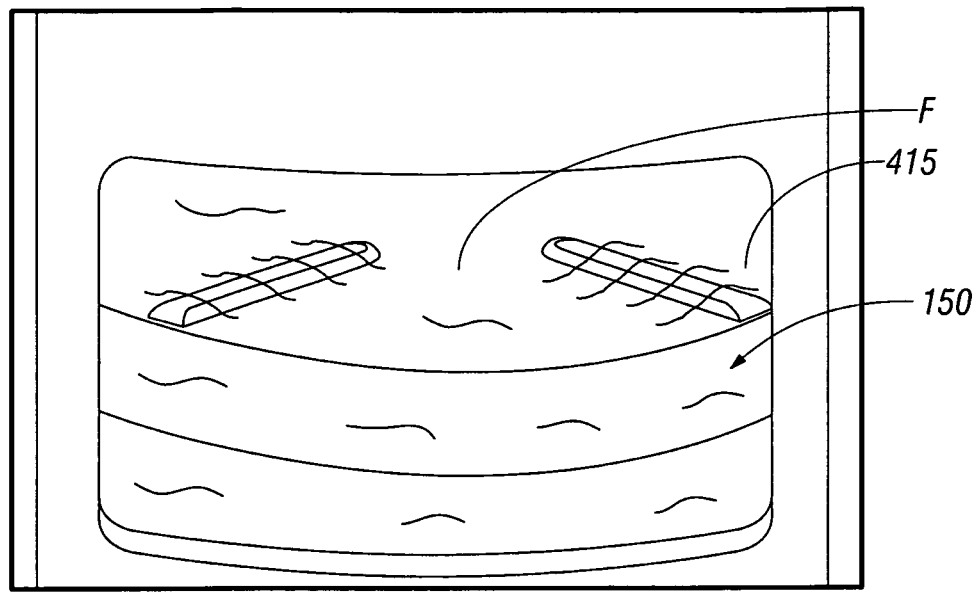
FIG. 7A shows a perspective view of an early stage of columnar frost formation on the primary condensing surface.

It has been observed that due to the pressure of the gas or the temperature of the gas at the non-primary condensing surface 25, a planar film will be formed (on bracket 25 of FIG. 5C) instead of a structure consisting of columns with partial bonding between columns, which is analogous to the frost F formed on the primary condensing surface 15 (FIG. 5B). Since the rate of introduction of the gas on the deposited surface from the drain hole 45 to the bracket 25, occurs more slowly and with less pressure, the columnar shaped frost F, (which is favored) will not be formed at bracket 25. Instead, a planar frost film will be formed and will be deposited on the bracket 25. Internal stresses will increase over time and break the film. Flakes can then be ejected, and then contact relatively warmer surfaces of the cryopump 10. The flakes will then sublimate to cause a pressure excursion into the vacuum chamber. Instead, it is desired to form the frost with columnar and thick structure as shown in FIG. 7A on the primary condensing surface 15 shown in FIG. 5C.

Figure 2:
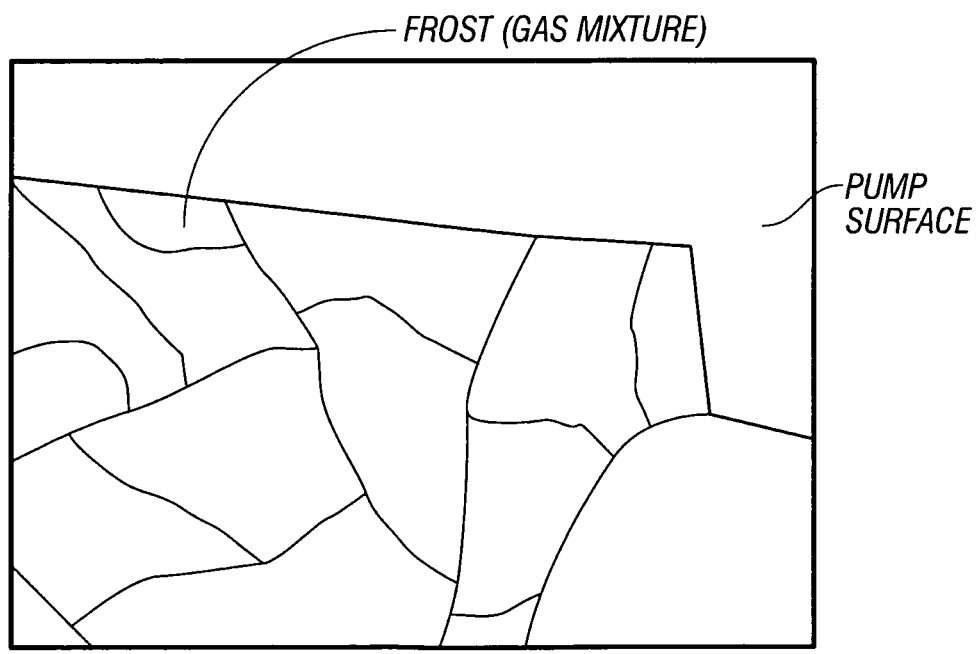
FIG. 2 shows a thin film deposition for a mixture of condensed gases on the non-primary condensing surface of the cryopump with the condensed material showing severe cracking of the film and the formation of flakes which may result in a pressure excursion.

Turning now to FIG. 1 and FIG. 2, there is shown a planar film being deposited on a non-primary condensing zone of the cryopump 10 under two different conditions. In FIG. 1, the planar film is formed from a pure single gas, while in FIG. 2, the planar film is formed with a gas mixture. Alternating layers of condensed films of differing gases can create increased stress between the film layers. In FIG. 2, differential stress between differing gas film layers result in severe cracking and delaminating of the film structure. As can be seen, the planar film of FIGS. 1 and 2 both are formed with a very long range ordered pattern that can crack and form flakes that will be ejected, warm, and sublimate from a solid to a gas which will affect the vacuum pressure in the chamber. Moreover, this ejection does not occur in a predictable manner, but instead occurs in a spontaneous and unpredictable manner. The random ejection of flakes can affect the vacuum pressure of the vacuum chamber in a spontaneous and uncontrolled manner.

Figure 3A:
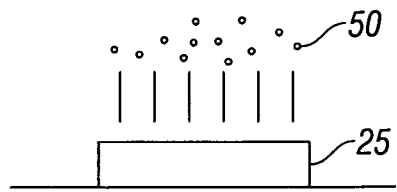
FIGS. 3A through 3C show a film being deposited on a cryopump surface with the film having an internal stress.
Figure 3B:
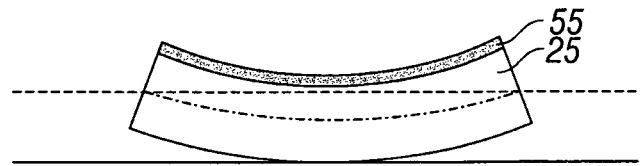
Figure 3C:
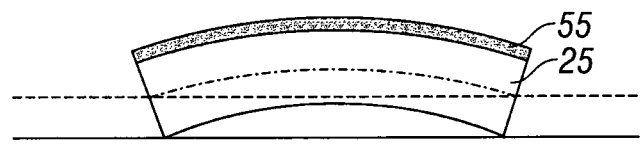
Figure 3D:
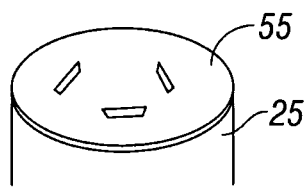
FIGS. 3D through 3F show a number of normally observed cracking patterns for a film.
Figure 3E:
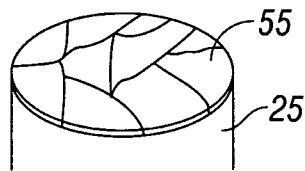
Figure 3F:
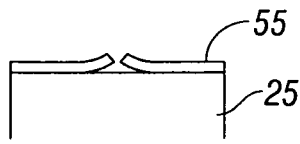

Turning now to FIG. 3A through 3E, there is shown a number of different cracking patterns that can occur with a planar film. First, as shown in FIG. 3A, the gases 50 will condense on a bracket 25 of the array 20 as shown in FIGS. 5B and 5C. Due to the temperature of the bracket 25, the temperature of the gas, and the pressure of the incoming gas from the drain hole 45, frost 55 will form with an internal stress. This stress can be tensile (FIG. 3B) or compressive (FIG. 3C), and over time the condensed material will become thicker and may have varying compositions, which can cause surface cracks to form (FIG. 3D), or can cause channeling (FIG. 3E) or can cause a debond, or a separation of planar film layers (FIG. 3F). Any of the shown frost configurations in FIGS. 3D-3F can result in a disfavored pressure excursion.

The present cryopump includes a configuration that prevents high stress planar film from forming in amounts that cause cracked flakes to be ejected, sublimate, and then cause pressure excursions (which may affect the vacuum pressure in the associated chamber). The present cryopump 10 also has a configuration that prevents flakes from forming and thermally contacting relatively warmer portions of the cryopump 10.

Figure 5A:
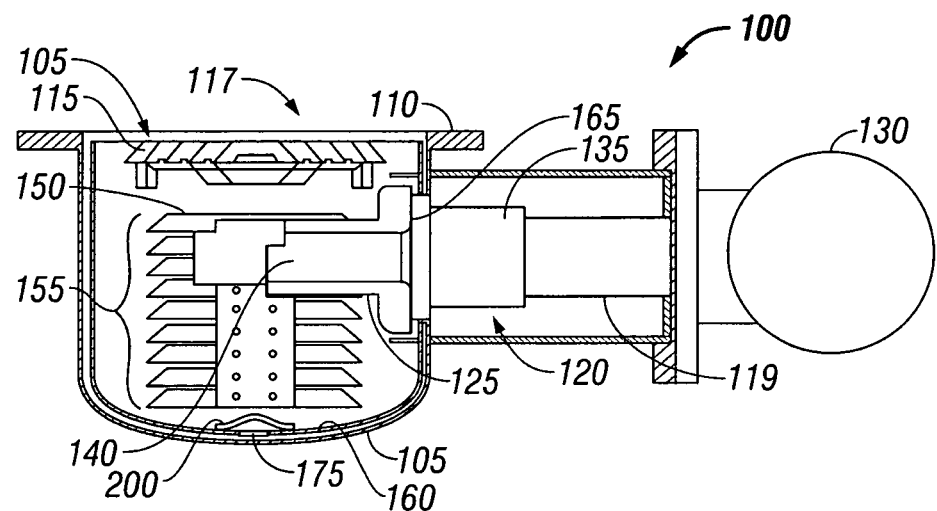
FIG. 5A shows a side view of a cryopump according to a first embodiment including a baffle to prevent gas flow through a drain hole.
Figure 5B:
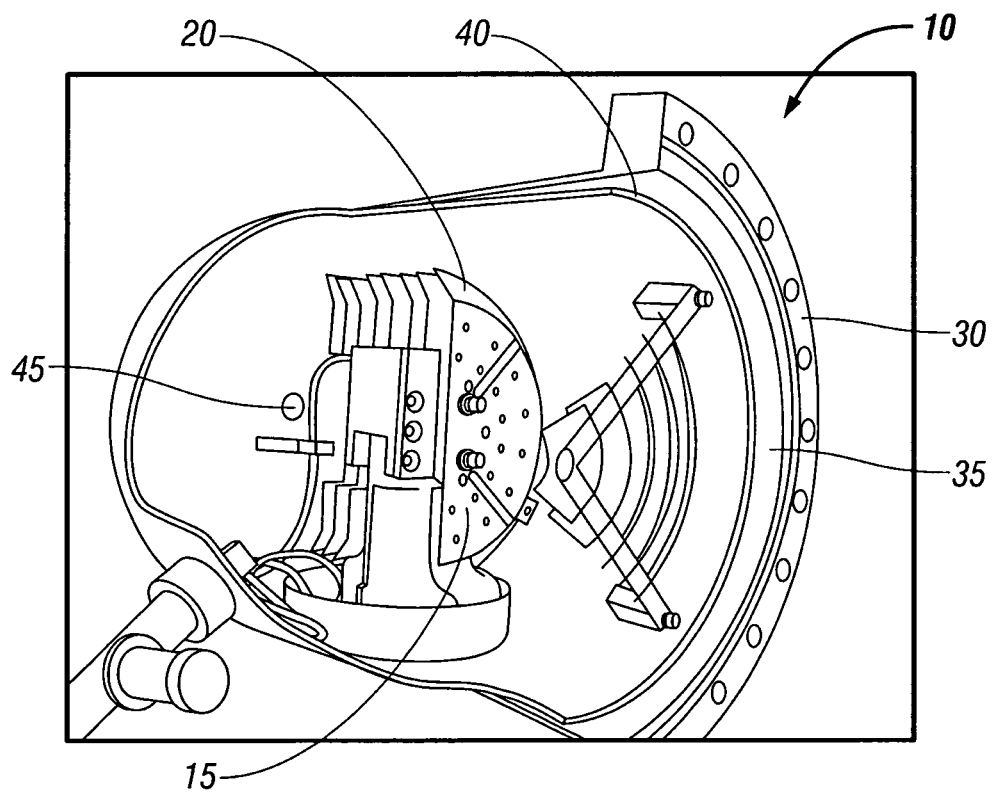
FIG. 5B shows a cut away view of the cryopump with the vacuum vessel and the sputtering plate removed to show a disfavored path for gas flow from an annular space between the vacuum vessel and up through a drain hole in the radiation shield.
Figure 5C:
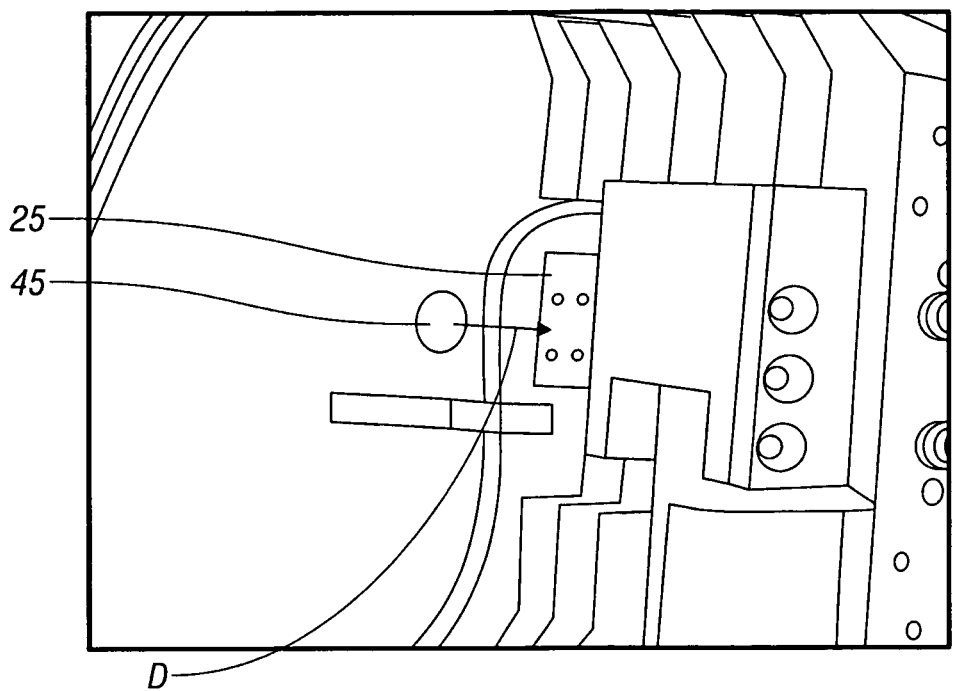
FIG. 5C shows an enlarged view of the drain hole of FIG. 5B.
Figure 5D:
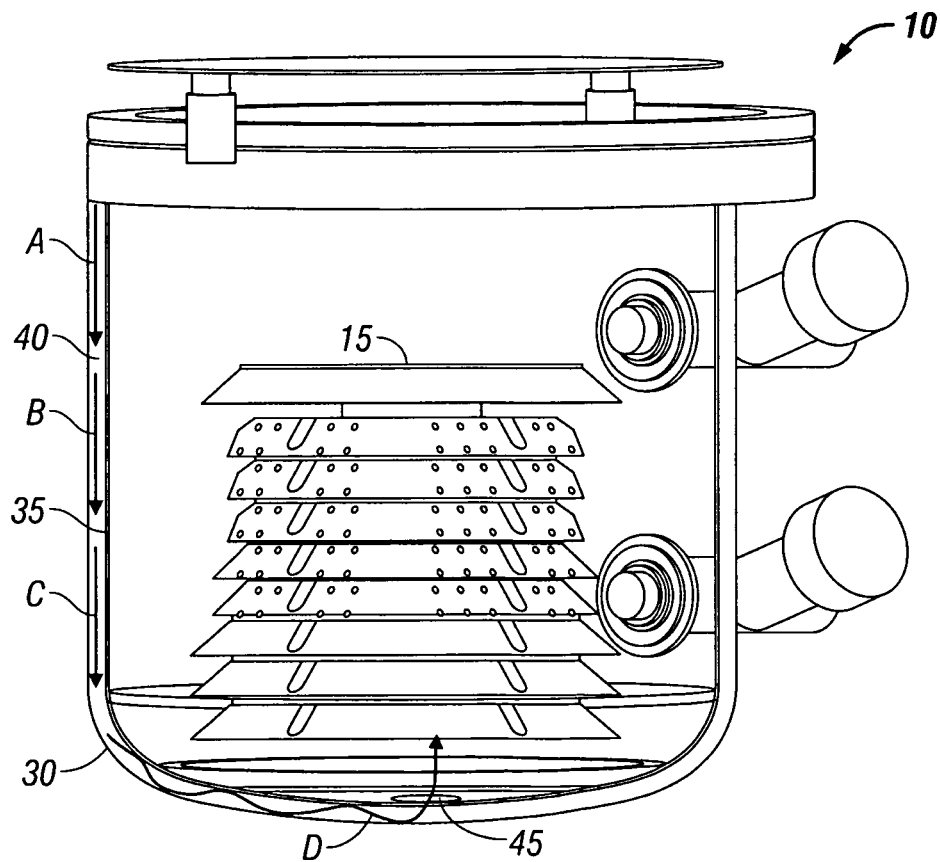
FIG. 5D shows a disfavored gas flow path in an annular space defined by the radiation shield and the vacuum vessel.

Turning now to FIG. 5A, there is shown a cryogenic pump 100 that may be used in connection with the present disclosure. The cryogenic pump 100 is described in detail in U.S. Pat. No. 5,782,096 to Bartlett et al., which is incorporated by reference in its entirety. The cryogenic pump 100 includes a vacuum vessel 105 that is connected to a flange 110 for supporting the vacuum vessel 105 in a chamber for wafer handling.

The cryogenic pump 100 includes a front opening 115 that communicates with the chamber, such as a transfer chamber, or process chamber. The cryogenic pump 100 is connected to a two stage refrigerator. The two stage refrigerator includes a finger 120 that protrudes into a vacuum vessel 105 through a cylindrical portion 125. In one embodiment, the refrigerator may be a GIFFORD-MACMAHON refrigerator; however, other refrigerators may be used in connection with the present cryopump 100. The cryopump 100 also is connected to a motor 130. The motor 130 drives a two-stage displacer in the cold finger 120. With each cycle a helium gas is introduced into the cold finger 120 under pressure and is expanded, cooled, and then exhausted. A first stage heat sink 135 is mounted at the cold end of the first stage. A second heat sink 140 is also mounted to the cold end of a second stage.

The primary pumping surface 150 of the cryopump 100 includes an array of baffles 155 mounted to the second stage heat station 140. This array of baffles 155 is held at or below twenty degrees Kelvin. This provides for condensing gases and preferably this primary pumping surface 150 (baffles 155 mounted to the second stage heat station 140) is for condensing low condensing temperature gases and to form frost in a thick favored columnar pattern on the primary condensing surface 150. The cryopump 100 further includes a cup shaped radiation shield 160. The radiation shield 160 is mounted to the first stage heat station 135. The second stage 140 including the cold finger 120 extends through an opening 165 of the radiation shield 160. The radiation shield 160 surrounds the second stage array 155 to minimize heating of the array 155 by radiation. Preferably, the temperature of the radiation shield 160 is less than about one hundred thirty degrees Kelvin.

Figure 6:
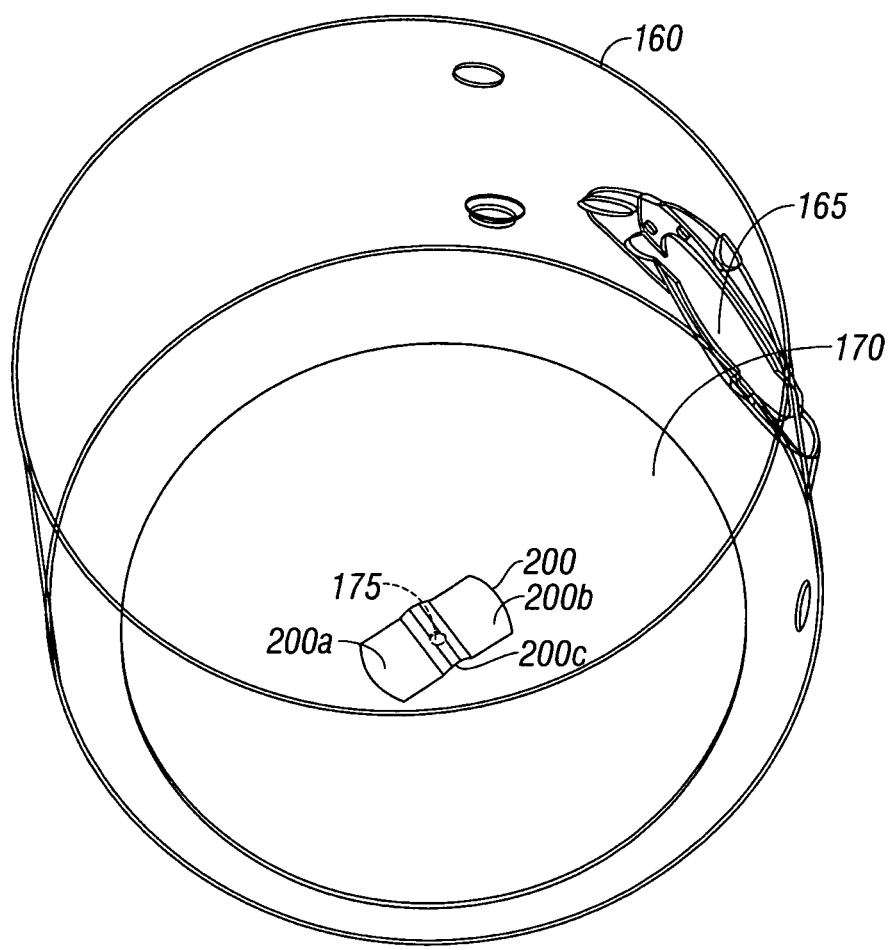
FIG. 6 shows a perspective of a radiation shield including a baffle disposed over an optimized sized drain hole to prevent flow of gas to non-primary condensing surfaces of the cryopump.

Turning now to FIG. 6, there is shown a view of the radiation shield 160 with the array of baffles 155 and the second stage heat station 140 removed. Disposed on a bottom surface 170 of the radiation shield 160 is a drain hole 175. The drain hole 175 is used during regeneration of the cryopump 100, where the cryopump 100 is taken out of operation and warmed to remove the condensed material from the array 155. The drain hole 175 is generally circular shaped and located through the bottom surface 170 to permit liquid material to escape during a regeneration process.

However, in operation of the cryogenic pump, the drain hole of the prior art has detrimental effects that affect the vacuum pressure in the chamber. The drain hole allows gas to access the non-primary condensing surfaces 25 of the cryogenic pump. In operation, the drain hole of the prior art permits gas to traverse from between the vacuum vessel 105 and the radiation shield 160 through the drain hole 175 in an upward manner to the array 155. This causes gas to condense on the non-primary condensing zones 25 of the array 155. In this embodiment, the radiation shield 160 includes a "U" shaped baffle 200 connected over the drain hole 175. The drain hole 175 also has an optimal aperture size. The "U" shaped baffle 200 is a resilient thin metal member that is placed over the drain hole 175. The "U" shaped baffle 200 preferably blocks the drain hole 175 during operation of the cryopump 100 and simultaneously permits fluid to escape from the drain hole 175 during regeneration. It should be appreciated that the "U" shape is not limiting and another occlusion member may be placed over the drain hole 175.

Due to the warming and cooling of the cryopump components including the baffles 155 that include charcoal to trap hydrogen, charcoal may become dislodged over time and break off. The charcoal can clog the drain hole 175. Here, the baffle 200 includes an additional benefit as the baffle 155 also prevents the charcoal from clogging the drain hole 175 by blocking the charcoal. In this aspect, the "U" shaped baffle 200 has a suitable height to prevent pieces of charcoal from clogging the drain hole 175.

During operation of the cryopump 100, the baffle 200 prevents substantial amounts of gases from entering the vacuum vessel through the drain hole 175, and ensures that the gases travel around the radiation shield 160 to be captured and condensed on the primary condensing surface 150. The baffle 200 has a "U" shaped portion 200c that provides a clearance of about 0.090 inches above the drain hole 175. The baffle 200 also includes first and second arms 200a, 200b that are welded to the bottom surface 170. The baffle 200, in one embodiment, includes a length from tip to tip of the arms 200a, 200b of 1.5 inches and has a metal thickness of 0.02 inches. The drain hole 175 preferably is also optimized and narrow to allow for fluid to be drained, but also, to prevent gases from entering the radiation shield 160 as gases will contact the section 200c and be redirected to the primary condensing surface 150 shown in FIG. 5A. In another embodiment, the baffle 200 may be placed outside the radiation shield 160 over drain hole 175 rather than inside the radiation shield 160 as shown.

Figure 4A:
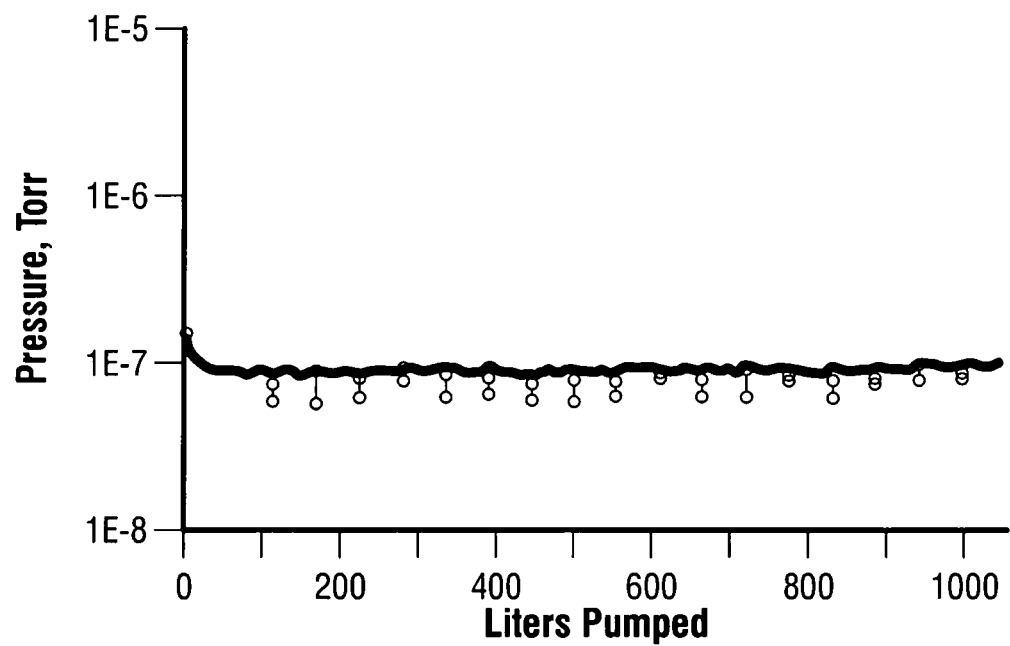
FIG. 4A shows a pressure plot of the first embodiment showing the pumped chamber with a constant recovery vacuum pressure of $1 \times 10^{-7}$ Torr.

During operation, most of the gas is prevented from entering from the drain hole 175 (FIG. 5A), and instead is captured at the primary condensing surface 150. In addition, gas that attempts to travel through the hole 175, is blocked by the baffle 200, and then is redirected to the inner surfaces of the radiation shield 160 rather than the non-primary pumping surfaces 25. Moreover, as shown in FIG. 4A, the vacuum pressure of the chamber is shown in pressure versus liters pumped as stable and at a desired vacuum pressure of $1\times10^{-7}$ Torr. In FIG. 4A, about 596 liters were pumped.

Figure 4B:
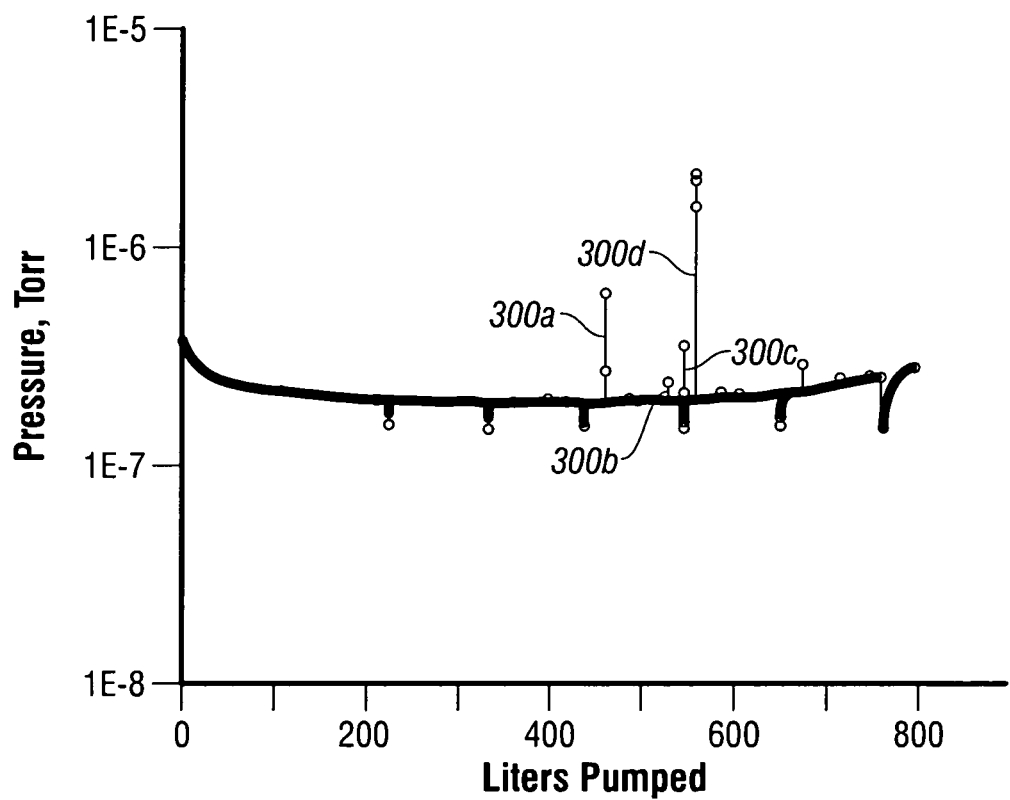
FIG. 4B shows a pressure plot of a pumped chamber with a vacuum pressure of $1 \times 10^{-7}$ Torr with several pressure excursions attributed to the flakes breaking off and sublimating.

Contrast that operation of a cryopump without the "U" shaped baffle 200. FIG. 4B shows a plot of pressure over liters pumped without a baffle 200 in FIG. 4B covering the drain hole 175. Here, only 288 liters were pumped. Notably, the pressure against liters pumped for this configuration is shown in FIG. 4B. In comparison to FIG. 4A with the baffle 200, in FIG. 4B, there are several pressure spikes 300a, 300b, 300c, and 300d. These spikes are locations where the pressure increases from the desired vacuum pressure of $1\times10^{-7}$ Torr to about $1\times10^{-6}$ Torr or higher, which can affect the vacuum chamber and semiconductor fabrication processing operations therein. As can be appreciated, the "U" shaped baffle 200, prevents gas from improperly entering cryopump 100 through the drain hole 175 and instead directs the gas to the primary condensing surface 150 which prevents pressure spikes as shown in FIG. 4B, but at the same time also permits regeneration functions or the draining of warmed condensed liquid from the radiation shield 160. Further, the baffle 200 also prevents the drain hole 175 from clogging with pieces of stray charcoal that can fall from the array 155.

Figure 8A:
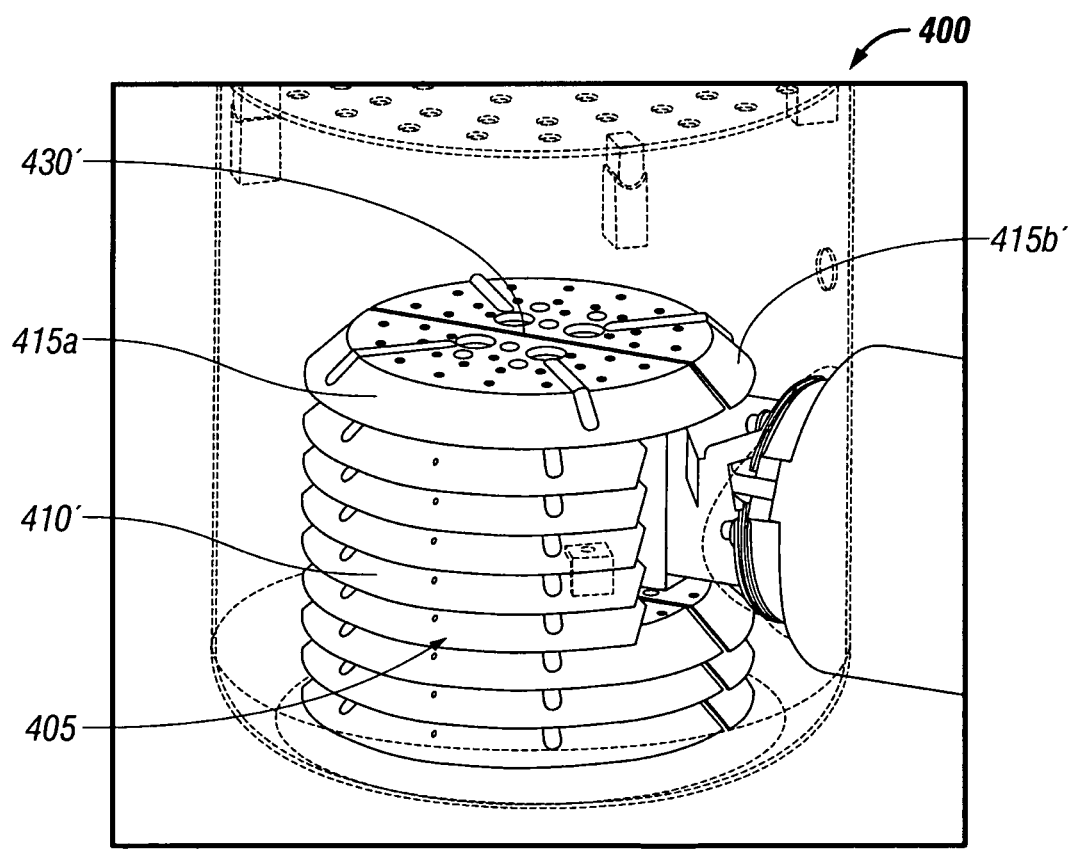
FIG. 8A shows a prior art primary condensing surface including an array with a top plate having a separation between first and second semi-circular plates.
Figure 8B:
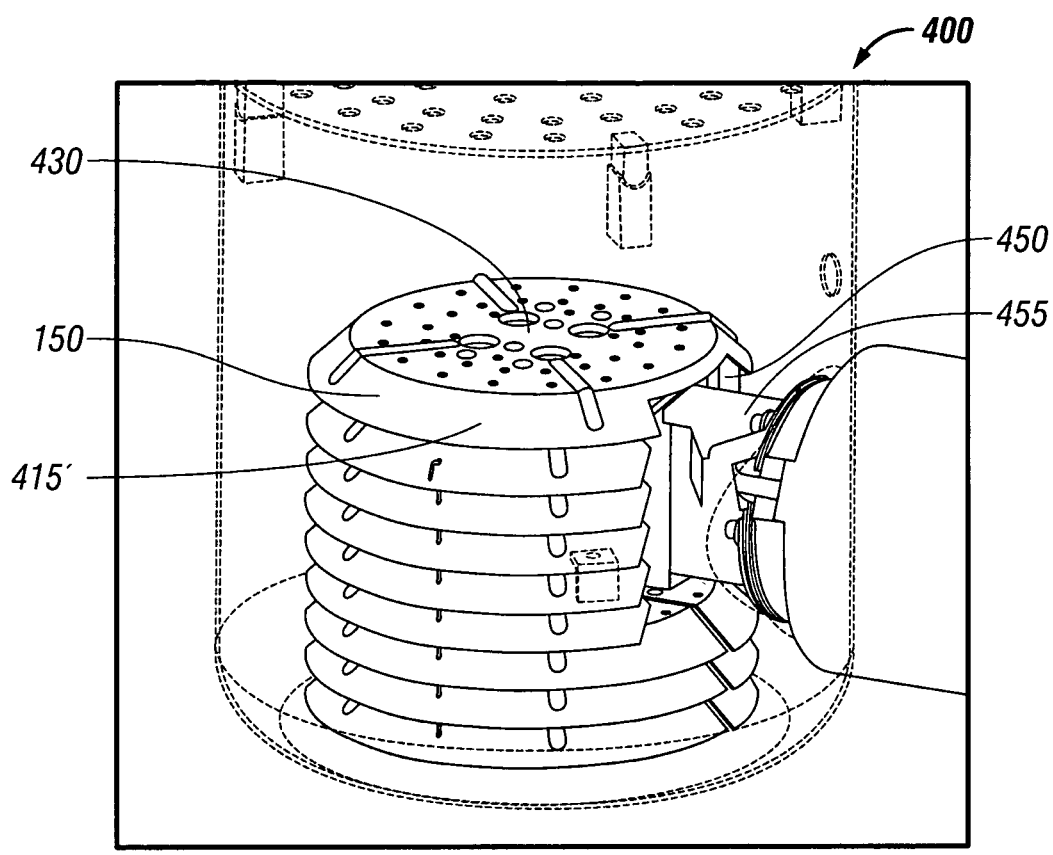
FIG. 8B shows an array with a unitary top plate and notch.
Figure 11:
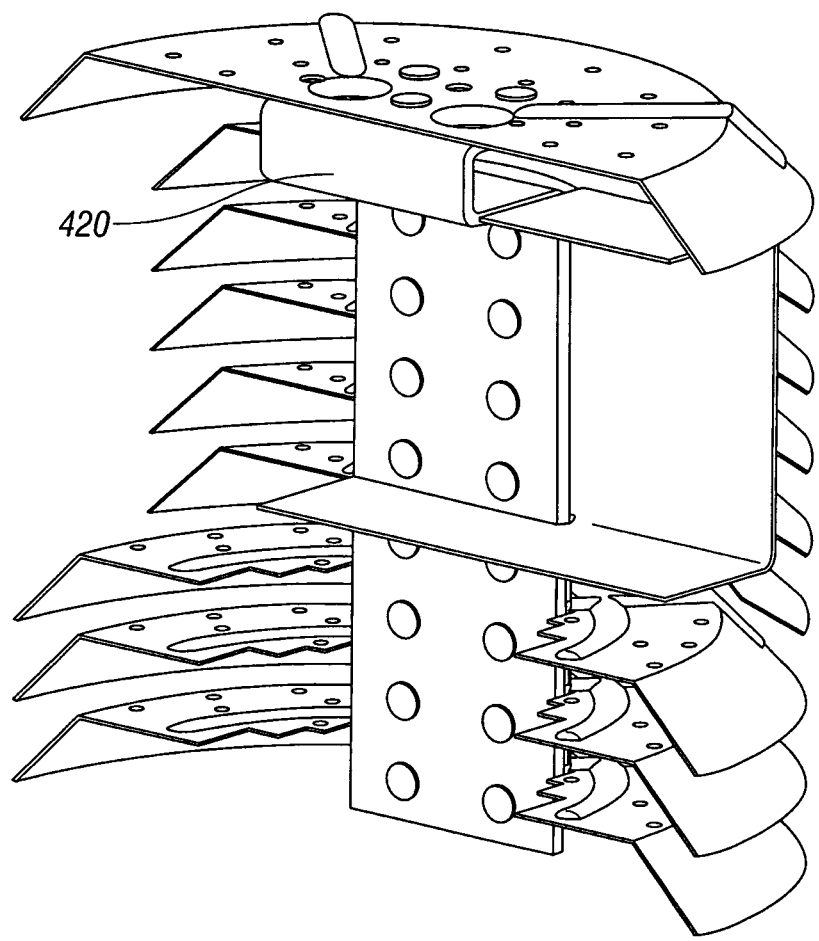
FIG. 11 shows a side view of another embodiment of the shield of FIG. 8A.

Turning now to FIGS. 8A and 8B, there is shown another cryopump embodiment of the present disclosure shown as reference number 400 compared against a different prior cryopump 400'. Turning to FIG. 8A, the cryopump 400' of this prior art embodiment includes a second stage 405' with a number of baffles 410'. In this prior art embodiment, a top plate 415' of the baffles 410' is sectioned into semi-circular baffle sections or a first baffle section 415a' and a second baffle section 415b'. Each of the baffle sections 415a', 415b' is connected to a bracket 420 (FIG. 11). The bracket 420 extends longitudinally as shown in FIG. 11 and connects to a heat station (not shown) which is described in U.S. Pat. No. 4,555,907 to Bartlett, which is herein incorporated by reference in its entirety.

Turning now to FIG. 8A, a junction is positioned between the first baffle section 415a' and the second baffle section 415b' which forms a space 430', or channel therebetween. It is observed that this channel 430' is at the junction between the first baffle section 415a' and the second baffle section 415b'. During operation of the cryopump 400', the channel 430' decreases an overall capacity of condensed material that rests on the sections 415a' and 415b' of the cryopump 400'. Moreover, this channel 430' affects a shape of the frost that condenses on a top surface of the first and the second semicircular baffle sections 415a', 415b'. As described above, the channel 430' can cause the frost condensation to form in two separate semi-circular cylindrical blocks of condensed material that extends and aggregates above the first and second semicircular baffle sections 415a', 415b'. These blocks notably do not comingle with one another as they accumulate. This channel 430' decreases the overall capacity of the cryopump 400', as space is lost between sections 415a', 415b'.

Turning now to FIG. 8B, the cryopump 400 of this embodiment includes a generally planar single circular shaped baffle 415 instead of the first and second semicircular shaped baffles 415a', 415b' shown in FIG. 8A. In the embodiment shown in FIG. 8B, the planar single circular shaped baffle 415 does not include the channel 430' and instead includes a flat surface 430 where the channel 430' was located in FIG. 8A. This extra surface 430 increases a capacity of frost that can condense on the planar circular shaped baffle 415. Further, this also increases the capacity of the cryogenic pump 400 while retaining the same size and small footprint as compared with the embodiment of FIG. 8A.

Moreover, any frost that condenses on the planar shaped baffle 415 may form a relatively larger cylindrically shaped block of columnar frost in the location where the channel 430' was located in FIG. 8A. This cylindrical shaped section of condensed frost is generally attributed to the uniform distribution of the frost condensed on the surface 430 of the planar circular shaped baffle 415 among other factors previously mentioned.

Figure 7B:
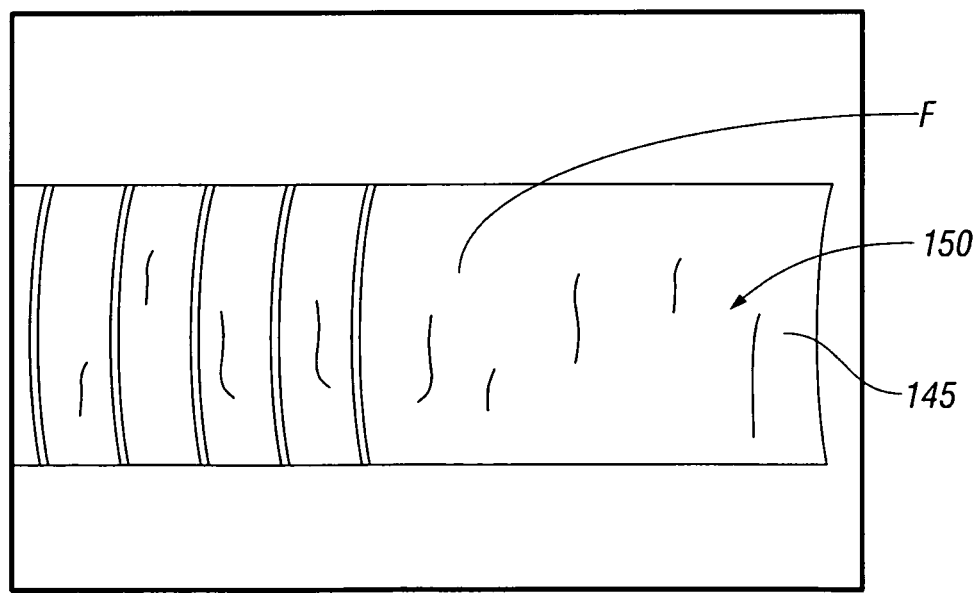
FIG. 7B shows a perspective view of the columnar frost on the primary condensing surface at full capacity.
Figure 7C:
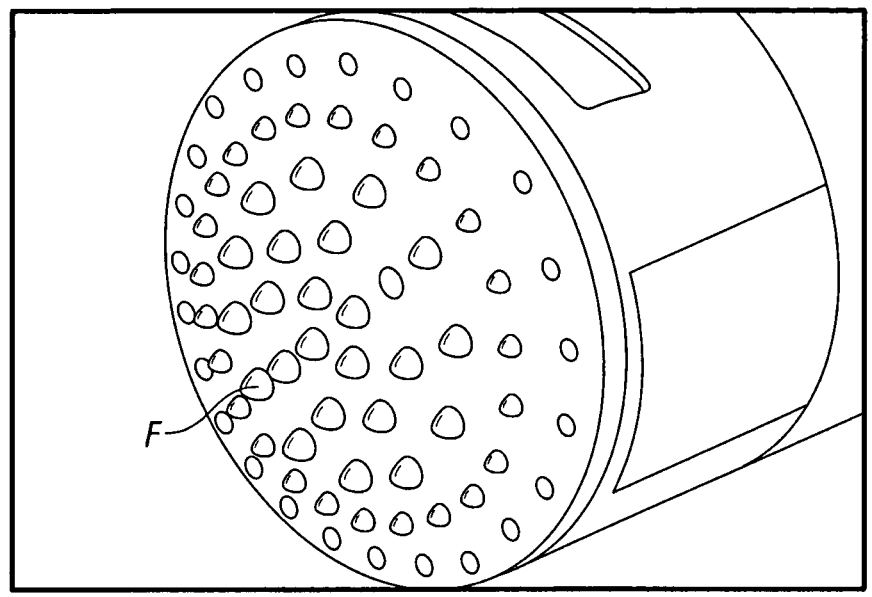
FIG. 7C shows view of the columnar frost extending through a sputtering shield.

Turning to FIG. 7A through 7C, there is shown a perspective view of the primary condensing surface 150 including the circular shaped baffle 415 of FIG. 8B. As can be seen from the figure, the frost F forms in a tightly packed and solid cylindrical shape. Moreover, this shape increases a capacity of the amount of condensed frost F that can form relative to a similarly sized primary condensing surface having a channel 430' shown in FIG. 8A. It has been observed that by forming the primary condensing surface 150 with a flat circular shaped baffle 415 (FIG. 8B) a test cryopump can increase an overall capacity of the cryopump by more than fifty percent with other discussed factors. In one embodiment, the amount of pumped gas may increase to over 1,000 liters from about 650 liters. Various pumping configurations are possible and within the scope of the present disclosure and the illustrative increases are merely illustrative, and not limiting to the present disclosure.

Turning again to FIG. 8B, the generally planar single circular shaped baffle 415 preferably also includes a notch 450. The notch 450 may be an orthogonally shaped cutout of the baffle 415. The notch 450 preferably provides a clearance distance between the baffle 415 and warmer surfaces of the cryopump 400, such as a shield 455 that is connected to the radiation shield (not shown) which is at a temperature of about 50 to 120 degrees Kelvin. The baffles 415' forms the primary pumping surface 150. The shield 455 is considerably warmer than the primary pumping surface 150 of the cryopump 400. The notch 450 provides that frost can form on the baffle 415 during the normal operation and cycle of the cryopump 400 without contacting the warmer section of shield 455. Preferably, the notch 450 provides a clearance from the shield 455 of about 0.25 inches. Various notch size configurations are possible and within the scope of the present disclosure.

Figure 9:
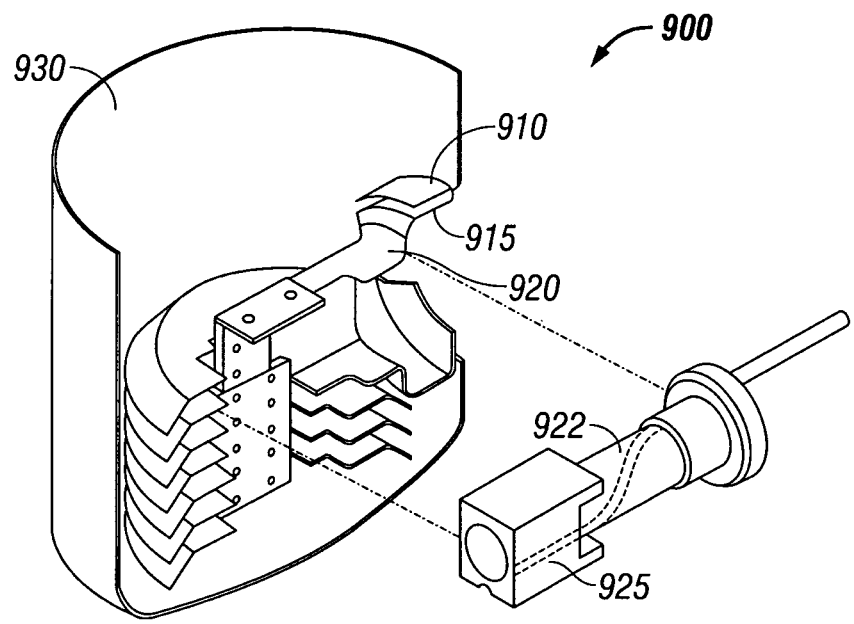
FIG. 9 shows a view of a prior art shield forming a second stage passageway.

In another embodiment, turning to FIG. 9, the cryopump 900 includes an extension 910. The extension 910 and a shield 920 connected to the extension 910 form a passageway 915 with the extension 910 on a top surface or surrounding the shield 920 as shown. The extension 910 is in thermal contact with the radiation shield 930 and is at about 100 degrees Kelvin. Shield 920 covers a cold cylinder 922 of the heat sink 925. Turning now to a side view of the passageway shown in FIG. 10, the passageway 915 is formed so a ratio of a width of the passageway 915 to a length of the passageway 915 is greater than or equal to five. The shield 920 (surrounding the heat sink 925 (FIG. 9)) and the cylinder 922 of the first stage of the refrigerator are the same as that which is described in U.S. Pat. No. 5,156,007 to Bartlett et al. which is herein incorporated by reference in its entirety.

Figure 10:
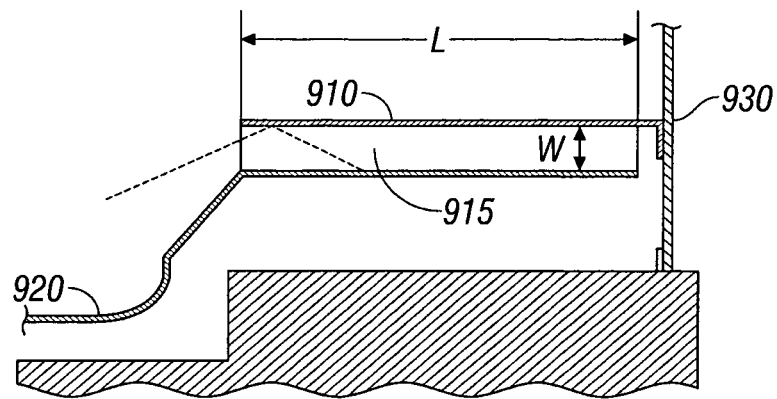
FIG. 10 shows a side view of a passageway of FIG. 9.

As shown in FIG. 10, the passageway 915 includes a long narrow feature that ensures that no gas molecules will traverse the passageway 915 (FIG. 9). The gas molecules will bounce along the warm surface of the extension 910. Gas molecules would also bounce along shield 920 that surrounds the heat station 925 and condensation will occur. The ratio of length to width of greater than five ensures that no gas molecules will enter the zone of second stage refrigeration cylinder 922. Condensation is prevented on the cylinder 922 and pressure variations due to gas emission from the cylinder 922 are eliminated.

Figure 13:
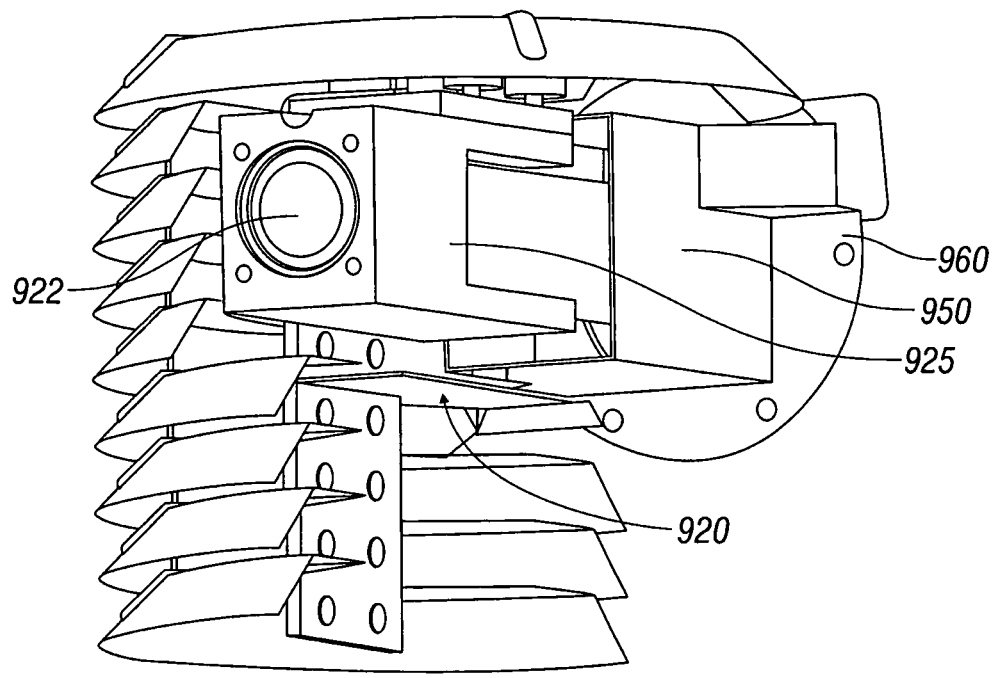
FIG. 13 shows a cutaway view of the second stage array assembly including the second stage shield and the first stage extension.

Turning now to FIG. 13, the extension 910 shown in FIG. 9 that is in thermal contact with the first stage need not be cylindrically shaped, but instead can be boxed shaped as shown with extension 950 in FIG. 13. Extension 950 also may have other shapes as required. In this embodiment, the extension 950 is generally orthogonally shaped.

Extension 950 contacts a radiation shield (not shown), that is in thermal contact with the first stage, by bracket 960 so the extension 950 is about the same temperature as the first stage heat station. Moreover, in this embodiment, the extension 910 shown in FIG. 9 need not be placed on the outside of the shield 920 as shown with FIG. 9. FIG. 13 shows that the orientation of these components may be reversed, and the extension 950 can be placed on the inside of the shield 920 of FIG. 9.

Figure 12A:
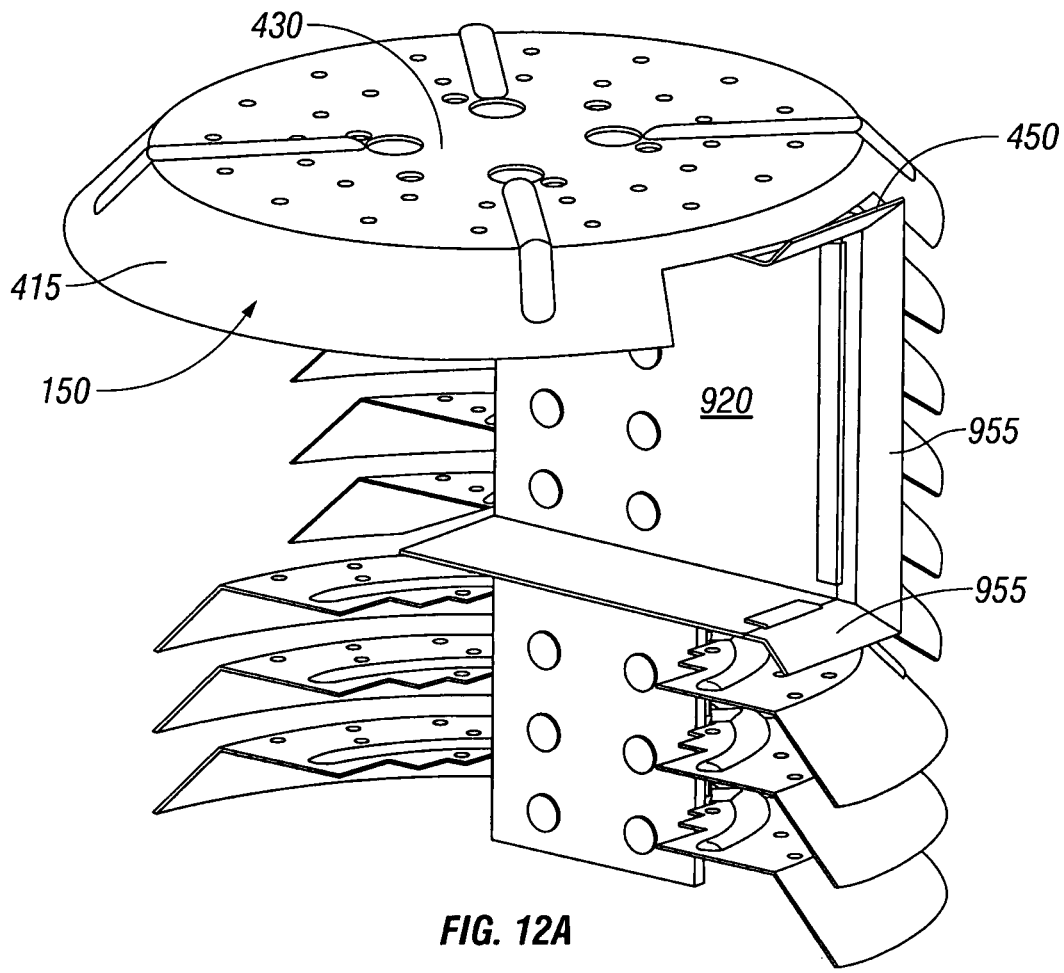
FIG. 12A shows a cut away view of the array including a shield with a flared end.
Figure 12B:
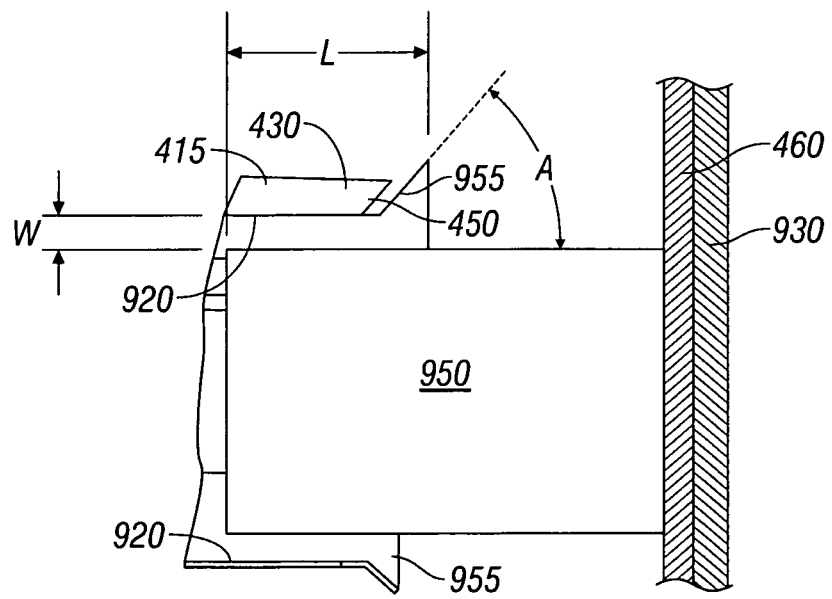
FIG. 12B shows a cross sectional view of the shield having the flared end.

Turning now to FIG. 12A, in this embodiment, the shield 920 is also generally rectangular shaped. The extension 950 of FIG. 13 fits into the shield 920, which is removed here for illustration purposes. Turning now to FIG. 12B which shows a side view of the shield 920 and the extension 950, the extension 950 thermally contacts the first stage through the radiation shield 930 (FIG. 9).

In this embodiment, an outer extremity of the shield 920 includes a flared end 955. Flared end 955 is adjacent the notch 450 of the top baffle 415 (FIG. 8B). The flared end 955 preferably permits condensation to form on the baffle 415 and the shield 920. The flared end 955 also provides for an increased clearance distance with this distance measured from the flared end 955 of the shield 920 to the extension 950.

This clearance increases an amount of frost that can form on the baffle 415 and shield 920 without allowing for the condensation to approach or otherwise touch, or thermally contact the extension 950 (which can form ejected flakes). The extension 950 is in thermal contact with the first stage by radiation shield 930 and bracket 460 (FIG. 12B) and is warm, and would likely cause a pressure excursion. Flared end 955 is shown with an angled surface in FIG. 12A; however, flared end 955 need not be angled, but instead should be formed with a clearance distance to separate the deposited frost from the relatively warmer extension 950. It should be appreciated that due to manufacturing tolerances and movement of the components during installation care should be exercised to ensure clearances are maintained during installation of each cryopump.

Turning to FIG. 12A, there is shown the shield 920 having the flared end 955 with the extension 950, that contacts the first stage by the radiation shield 930, being removed for illustration purposes. The flared end 955 is angled away from the extension 950 (FIG. 12B) by angle A. This provides for a separation to prevent frost from contacting the extension 950 (FIG. 12B) that is in thermal contact with the first stage by the radiation shield 930. Various angled configurations are possible, and within the scope of the present disclosure.

Figure 14A:
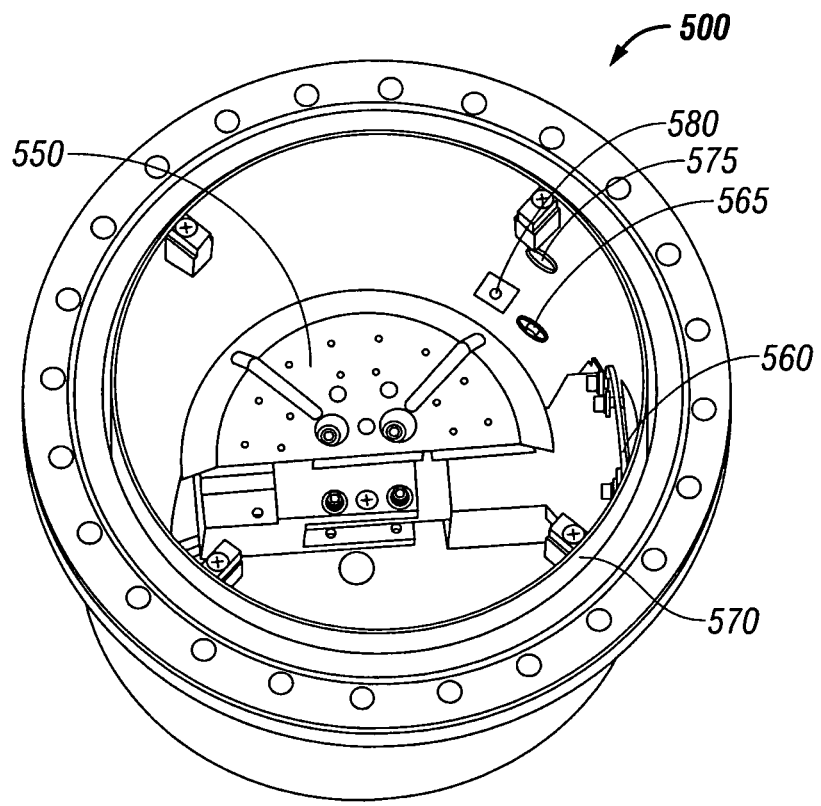
FIG. 14A shows a top view of a cryopump with one embodiment according to the present disclosure with a sputtering shield removed with the cryopump including a radiation shield with a purge hole removed and a diode wire hole sealed closed.
Figure 14B:
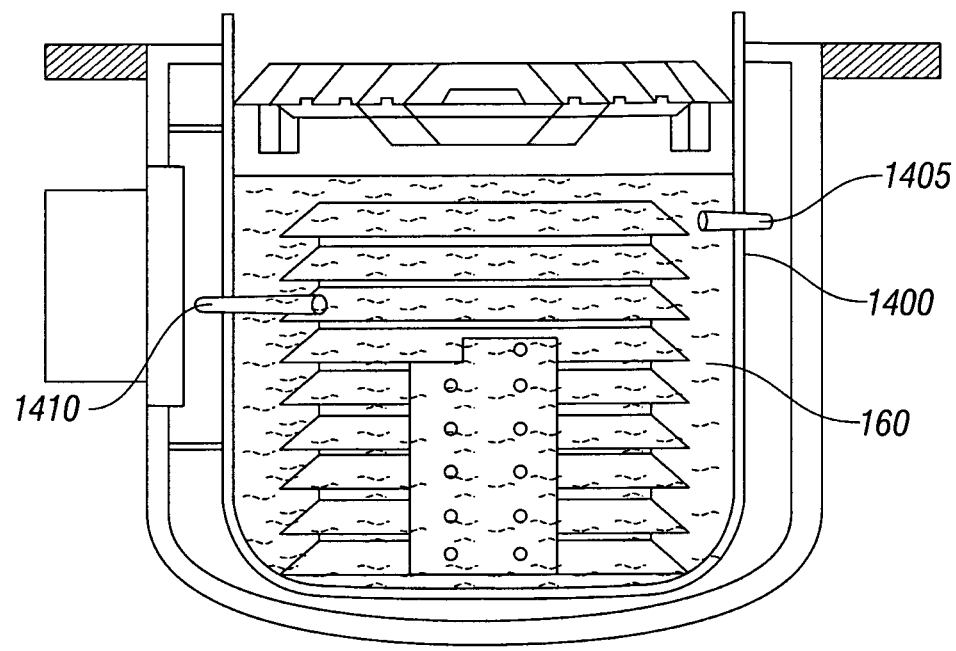
FIG. 14B shows a disfavored configuration with first and second spires of frost extending from the second stage array.

Turning now to FIG. 14A, there is shown a top view of the cryopump 500 according to another embodiment. In this embodiment, the sputtering shield is removed and a cut away view of the primary pumping surface 550 of the array is shown. In this embodiment, the radiation shield 560 is formed with a closed surface 565 without a purge hole. This closed surface 565 of the radiation shield 560 prevents gases from entering the cryopump 500 from a location between the radiation shield 560 and a vacuum vessel 570. Moreover, no frost can aggregate and extend towards or out of any purge hole when the pump 500 is at capacity, which can warm and sublimate when contacting warmer surfaces (FIG. 14B). As shown in FIG. 14B, a spire 1410 of condensed material can extend from such a purge hole. Purge may occur by introducing gas directly between the radiation shield 560 and vessel 570. It should be appreciated that control of other penetrations in the radiation shield internal volume other than the primary opening to the chamber need to be controlled in the same manner as the purge hole. This can be accomplished by a suitable occlusion to prevent spires 1410 of condensed material from extending out of the apertures to avoid a pressure excursion.

In the embodiment of FIG. 14A, the radiation shield 560 also a closed surface 575 where a third hole 580 is filled with a sealant. Third hole 580 is a diode hole. Third hole 580 can be a passageway for an electrical coupling through the radiation shield 560. Passageway 580 may be for coupling to electronic components of the cryopump, such as a sensor or the like. During an installation, the third hole 580 is filled with a suitable material to provide for a closed surface or an occlusion 575 that prevents gases from entering the cryopump from unwanted directions and prevents frost from aggregating therethrough during operation to avoid a pressure excursion. Turning now to FIG. 14B, there is shown a view of a first and a second spire of condensation 1405, 1410 extending from the second stage array 1400. This frost will aggregate or grow when gas flow paths are unmanaged, or when these other flow paths are not occluded.

Figure 15A:
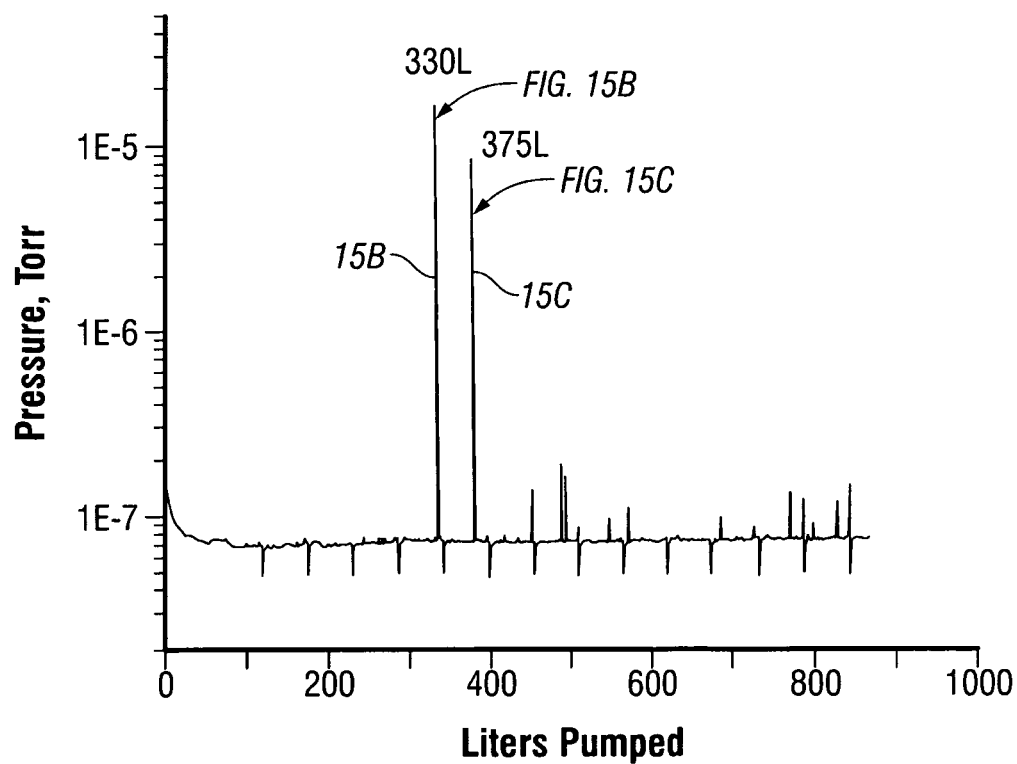
FIG. 15A shows a plot of a chamber recovery pressure over a number of wafer operations over a cycle of the pump with pressure excursion causing insufficient recovery times.
Figure 15B:
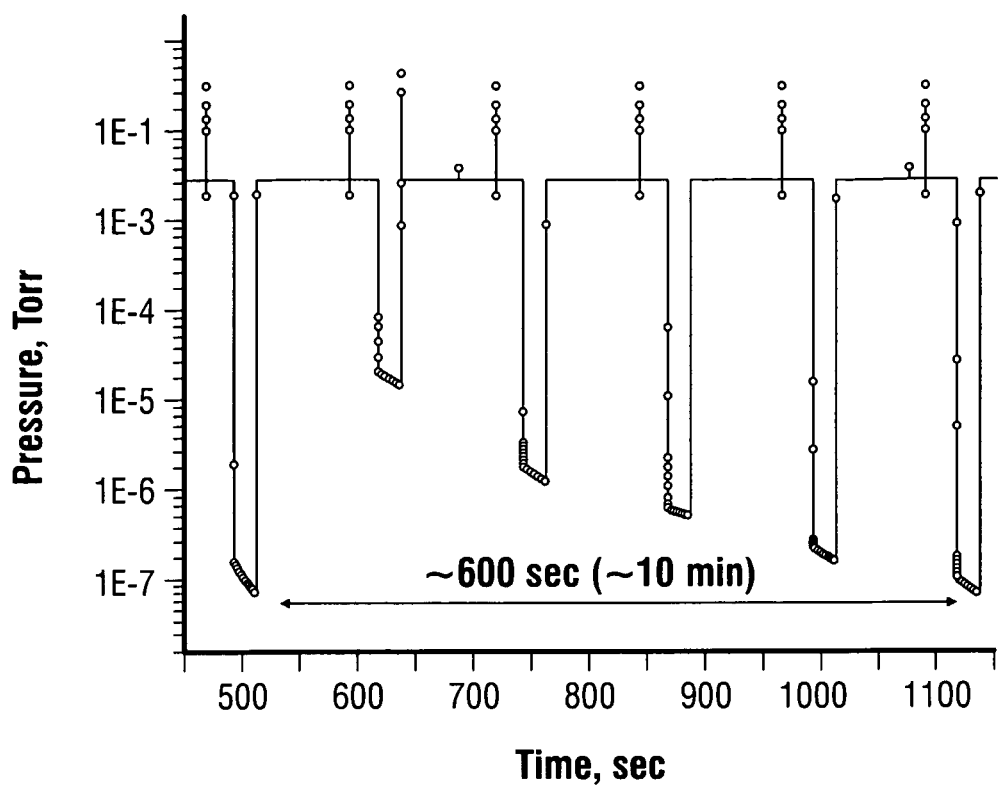
FIGS. 15B and 15C show plots of pressure over time at the pressure excursions of FIG. 15A.
Figure 15C:
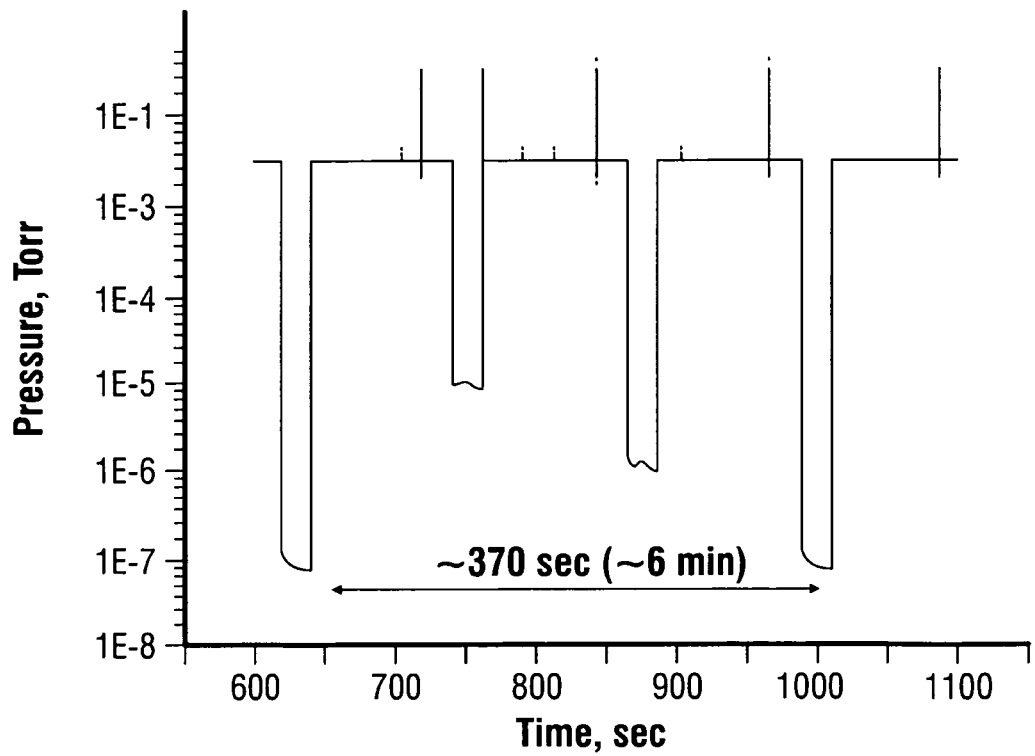

Turning now to FIGS. 15A, there is shown a plot of recovery pressure over liters pumped of a prior art cryopump. As shown, the recovery pressure of the chamber preferably is desired to be about $1 \times 10^{-7}$ Torr. It has been observed that operating experience with prior cryopumps indicates that pressure excursions will occur at a frequency of approximately once in every 50,000 semiconductor wafer processing cycles. However, these pressure excursions (where the pressure increases from the desired vacuum pressure to about $1 \times 10^{-5}$ Torr) may have adverse consequences. As can be seen in FIGS. 15B and 15C in an enlarged view of pressure over time, it is observed that the chamber pressure will take time to recover to the desired vacuum pressure of about $1 \times 10^{-7}$ Torr. As show, the time to recover can be about 10 minutes to about 6 minutes which can disrupt operation of the chamber. The cryopump of the present disclosure provides for no detrimental pressure excursions and expands the overall capability of the cryopump.

Turning now to FIGS. 16 through 19, there is shown another embodiment of the present disclosure showing another feature of the present cryopump 10 to eliminate pressure excursions. In this embodiment, the cryopump 10 includes a surface with a feature to reduce a "crack-forming" stress of deposits that condense on a non-primary condensing surface. The non-primary condensing surfaces 25 of the cryopump 10 include those previously described above, such as a bracket 25 (FIG. 5C) formed on the second stage array, or other surfaces. In this aspect, the planar film is not permitted to aggregate to a critical thickness where a crack-forming stress is sufficient to undergo spalling. This high stress can break the planar film to form flakes. In this aspect, turning now to FIGS. 16 and 17, the surface 1600 may include a number of raised protrusions 1605 with each protrusion 1605 having a height 1615 that extends from the surface 1600. The protrusions 1605 includes a centrally located aperture 1610, as shown, and may be disposed in a predetermined pattern or in a number of rows that are offset from one another. The protrusions 1605 are each generally cylindrically shaped with a flat base.

In another embodiment, the surface 1600 may be formed with a honeycomb pattern, or protrusions that are solid and do not include any aperture. The deposited gas that forms on a non-primary condensing surface 1600 will aggregate or otherwise be deposited having a reduced thickness and/or a non-contiguous surface. These number of hollow protrusions 1605 are disposed of on the surface, and include a patterned arrangement. The pattern is shown in FIG. 16 and controls a thickness of the planar film, as the frost is deposited on the protrusions 1605 and on the surface 1600. The pattern does not allow the frost to aggregate to a sufficiently large thickness where the planar film forms or results in a crack-forming stress. In another embodiment, the surface 1600 may include a surface to reduce the crack-forming stress. Turning now to FIGS. 18 and 19, there is shown another surface feature that reduces the crack-forming stress on the deposited planar film and that aggregates on the surface 1600.

In this embodiment, a number of "L" shaped brackets 1800 may be positioned on the surface 1600. The brackets 1800 may be formed by a welding operation or by a stamping operation on the surface 1600 during manufacture. In another embodiment, the brackets 1800 may be retrofit to an existing cryopump. Various configurations that minimize a crack-forming stress are possible and within the scope of the present disclosure. The brackets 1800 may be positioned in a number of patterns or rows on the surface 1600, or alternatively may be staggered, such as shown in FIG. 16.

Turning now to FIG. 19, a cross sectioned view of the brackets 1800 shows that each bracket 1800 may include a rectangular head 1805 connected to a body 1810 so the head 1805 extends above the surface 1600. The head 1805 is generally rectangular shaped and is generally thicker than a cross section of the body 1810. This feature controls a thickness of the planar film as the condensed frost aggregates on the surface 1600. In another embodiment, the head 1805 and the body 1810 can be formed as one integral unitary member that is connected to surface 1600. In another embodiment, the head 1805, body 1810 and surface 1600 may also be manufactured as one integral member.

In one embodiment, the non-primary condensing surfaces may be formed with a wire grating that is connected to the surface 1600. In another embodiment, the non-primary condensing surfaces 1600 may be stamped with a pattern that is formed on the non-primary condensing surfaces 1600. In another embodiment, the non-primary condensing surfaces 1600 may be stamped with a honeycomb pattern that is formed on the surfaces 1600. Alternatively, the pattern may include an irregular shaped pattern, a number of triangles, or a rough surface pattern. It should be appreciated that any pattern that reduces the crack-forming stress in the planar film by reducing a thickness of the deposited planar film as the condensed matter accumulates may be used in connection with the present disclosure. Various surface configurations are possible and within the scope of the present disclosure. In another embodiment, the brackets 1800 of the embodiment of FIGS. 18 and 19 may be bent, curved or angled in a direction toward the surface 1600 to further prevent the planar film from aggregating.

Figure 20C:
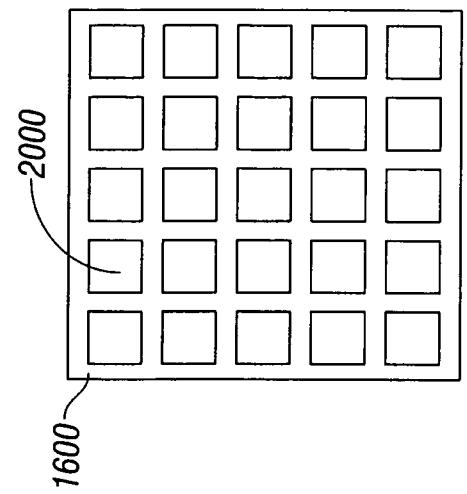
Figure 20F:
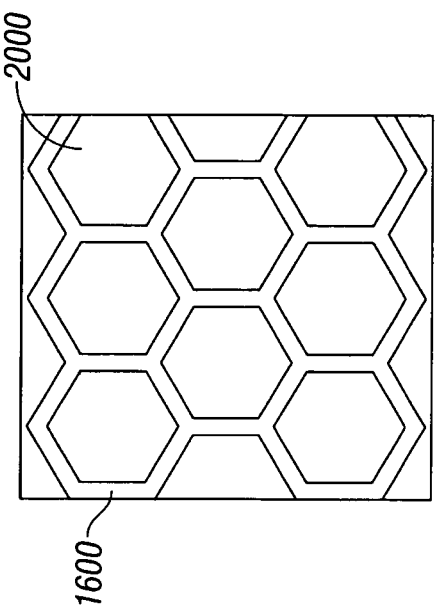
Figure 20B:
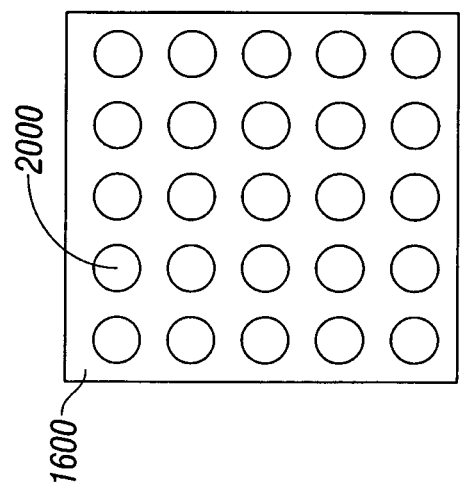
Figure 20E:
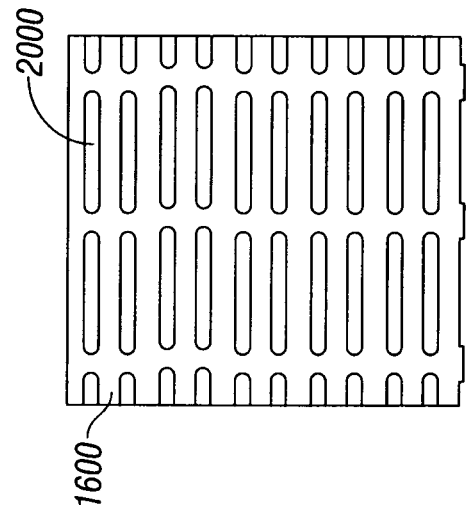
Figure 20A:
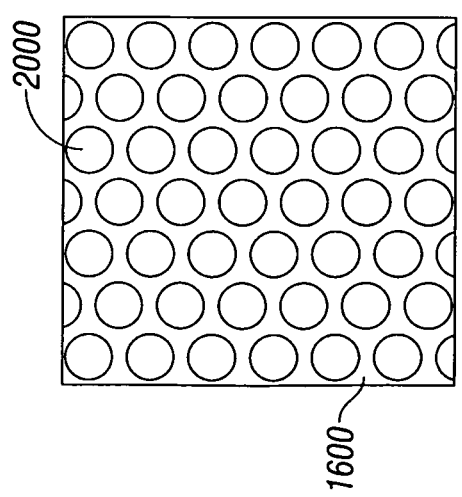
Figure 20D:
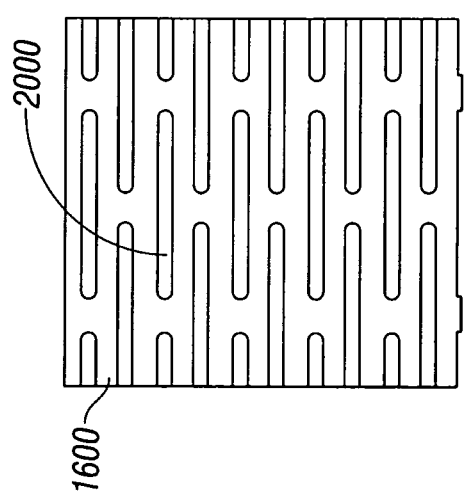

Turning now to FIGS. 20A through 20I, there is shown a number of different surface patterns for reducing the crack-forming stress. In FIGS. 20A and 20B, the pattern may include protrusions 2000 connected to the surface 1600 that are generally cylindrical shaped and solid and may be configured in straight rows (FIG. 20B) or in a staggered configuration (FIG. 20A). Alternatively, the protrusions 2000 may be formed as generally square (FIG. 20C) or in a number of rectangular protrusions 2000 that are positioned in staggered rows (FIG. 20D) or positioned in straight rows (FIG. 20E). In yet another alternative embodiment, the protrusions 200 may be formed in a number of six sided polygon shaped protrusions 2000 (a hexagonal shape). The protrusions 2000 overall form a honeycomb pattern as shown in FIG. 20F.

Turning now to FIGS. 20G and 20H, it should be appreciated that two or more different sized and shaped protrusions may be disposed on surface 1600 or a first protrusion 2000a and a second protrusion 2000b. As shown, the first protrusion 2000a may be an octagon shaped protrusion while the second protrusion 2000b may be circular. These are simply illustrative, and any shapes or sizes to reduce the crack forming stress can be used, and are within the scope of the present disclosure. In another embodiment, the first and the second protrusions 2000a, 2000b may be the same shaped protrusion, yet including different sizes. Turning now to FIG. 20I, the protrusions 2000c may include various shapes such as a oval shape, or any other polygonal shape known in the art, or even an irregular shape. Turning to FIG. 20J, there is shown a configuration of protrusions 2000 positioned on a surface 1600. In this embodiment, the protrusions are shown as each being generally cylindrical shaped. However, each of the protrusions 2000 may be separated from another protrusion by a fixed distance b in a vertical manner and separated by another distance c from an adjacent row. Moreover, the protrusions 2000 may be configured to be spaced from a lateral edge 2010 by a predetermined amount on the surface 1600.

Turning now to FIGS. 21A through 21D, there is shown a further embodiment of the cryopump for preventing frost flakes from ejecting and sublimating to prevent pressure excursions. In this embodiment, the cryopump includes an array that has a top plate 2100 that is shown separated from the remainder of the array of FIG. 12 for illustration purposes. In this embodiment, the top plate 2100 is formed in a solid manner as previously described. This is advantageous since the frost is allowed to aggregate on a top side 2105 thereof without any junction, which increases a capacity of the top plate 2100, or an amount of frost that may condense thereon.

Figure 21A:
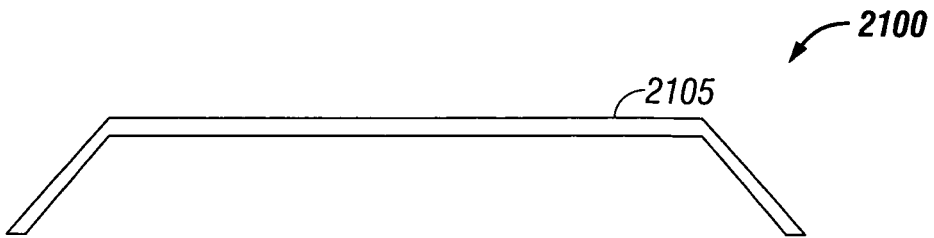
FIGS. 21A through 21D show several configuration for a top plate of the array that minimizes pressure excursions and protects frost from vibration.
Figure 21B:
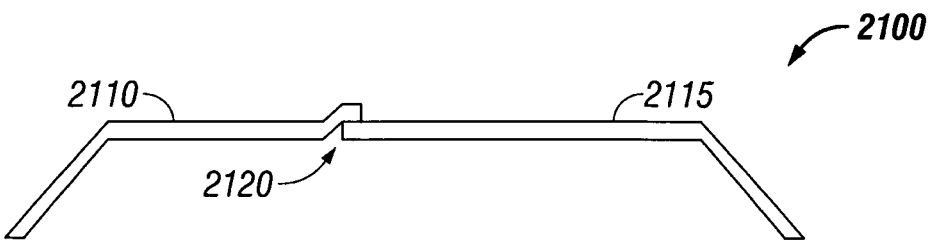

Turning to FIG. 21B, the top plate 2100 is formed with a first semicircular section 2110 and a second semicircular section 2115. As the frost is deposited on the top plate 2100, (formed by the first and second semicircular sections 2110, 2115) the frost will generally form a first columnar frost configuration and a second separate columnar frost configuration that do not comingle over time. As the cryopump is operating, due to several components such as the robot in the chamber, or the two stage refrigerator, the cryopump may be subject to a slight or constant vibration. In this aspect, the first columnar frost configuration and second columnar frost configuration may intermittently touch. This contact may cause a flake to be ejected from either the first or the second frost configuration, which later may sublimate and cause the pressure excursions discussed previously.

Turning again now to FIG. 21B through 21D, the cryopump of the present disclosure remedies this problem as the top plate 2100 includes a connection member 2120 that connects the first semicircular section 2110 to the second semicircular section 2115. The connection member 2120 mechanically couples the first and the second semicircular sections 2110, 2115 to inhibit relative motion between the first and the second semicircular sections 2110, 2115 to prevent first frost configuration and the second frost configuration from contacting one another during vibration to form flakes upon contact. In the embodiment of FIG. 21B, the connection 2120 includes an overlap of the first section 2110 over the second section 2115. Alternatively, the connection 2120 may include an overlap of the second section 2115 over the first section 2110.

Figure 21C:
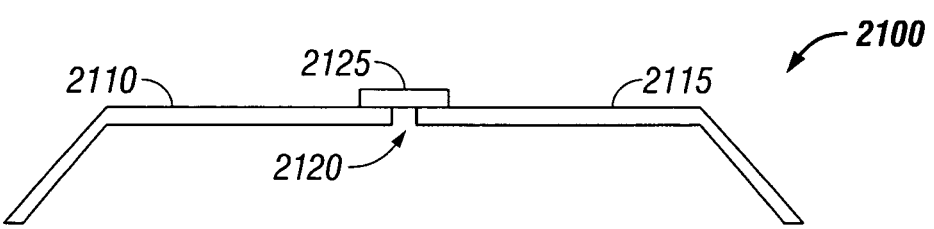
Figure 21D:
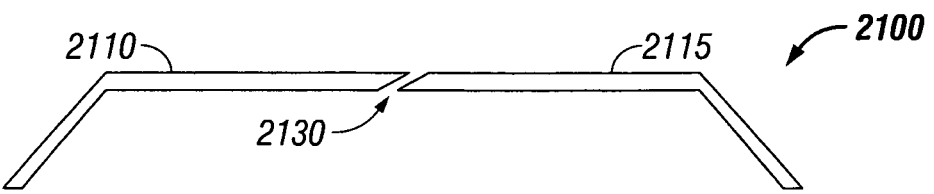

In one embodiment, the connection 2120 may be a bracket 2125 (FIG. 21C). The bracket 2125 is disposed at the junction between the first and the second semicircular sections 2110, 2115. The bracket 2125 preferably inhibits the relative motion of the first and the second semicircular sections 2110, 2115 during vibration of other components of the cryopump, or other machinery. In another embodiment of the present disclosure shown in FIG. 21D, the first and the second semicircular sections 2110, 2115 can be connected to one another such that the second semicircular section 2115 is disposed underneath the first semicircular section 2110. Alternatively, the first semicircular section 2110 may be disposed under the second semicircular section 2115 (not shown). Various configurations are possible and within the scope of the present disclosure.

In yet another embodiment, the primary pumping surface can be made with a support structure (not shown) that is rigidly connected to a stable surface. The support structure may provide that the frost is not susceptible to vibration or motion from other components and is insulated using a dampening device (not shown) or similar component to prevent the frost deposited on the primary pumping surfaces from contacting or otherwise vibrating against other surfaces of the cryopump, or from contacting other frost. In yet another embodiment, the first semicircular section 2110 and the second semicircular section 2115 may be connected in other ways to prevent relative motion of the deposited frost. The first semicircular section 2110 can be connected to the second semicircular section 2115 by a soldering operation, or a different interlocking interface as shown in FIG. 21C. In another embodiment, the top plate 2110 may be made into more than two sections, and instead may include a first section connected to a second section, which is connected to a third section. Each of the sections may be connected to one another to prevent or inhibit the relative motion of the columnar frost formed on the first through third sections (not shown). Various configurations are possible and within the scope of the present disclosure.

While this invention has been particularly shown and described with references to example embodiments thereof, it will be understood by those skilled in the art that various changes in form and details may be made therein without departing from the scope of the invention encompassed by the appended claims.

What is claimed is:
1. A cryopump comprising:
   a vacuum vessel;

a refrigerator having at least a first stage and a second stage;

a radiation shield mounted within the vacuum vessel and enclosing second stage cryopumping surfaces, the radiation shield and the second stage cryopumping surfaces configured to be cooled by the refrigerator of the cryopump, the radiation shield comprising:

a housing including a primary opening, an end opposite the primary opening, and a lateral side wall connected to the end, a frontal array being across the primary opening and the housing having an inner surface facing the second stage cryopumping surfaces and having an interior volume sufficient to hold the second stage cryopumping surfaces, the second stage cryopumping surfaces including primary second stage condensing surfaces and non-primary second stage condensing surfaces;

a drain hole located in a center region of the end of the housing to permit cryogenic liquid and gas to traverse therethrough during a regeneration operation, the drain hole providing for fluid communication between the interior volume of the housing and an annular space between the vacuum vessel and the radiation shield; and a baffle: (a) directly connected to the inner surface of the end of the radiation shield housing to extend across the drain hole and to cover the drain hole, wherein the baffle and the inner surface of the end of the radiation shield housing define a channel having two ends, the drain hole being in fluid communication with the channel at a location between the two ends and (b) configured to direct gases traversing through the drain hole away from the non-primary second stage condensing surfaces.

2. The cryopump of claim 1, wherein the baffle is substantially "U" shaped.

3. The cryopump of claim 1, wherein the baffle includes a first arm connected to the radiation shield housing, and a second arm connected to the radiation shield housing, and an intermediate section connected to the first arm and the second arm.

4. The cryopump of claim 1, wherein the baffle is curved to permit cryogenic liquid to traverse through the drain hole during regeneration of the cryopump.

5. The cryopump of claim 1, wherein the baffle is connected by a bonding.

6. The cryopump of claim 1, wherein the inner surface of the housing of the radiation shield is a cylindrical surface, the cylindrical surface facing the primary second stage condensing surfaces, and wherein the cylindrical surface is impermeable to gas flow.

7. The cryopump of claim 1, wherein the baffle includes a first arm connected to the radiation shield housing, and a second arm connected to the radiation shield housing, and an intermediate section connected to the first arm and the second arm and suspended above the drain hole.

8. A method of directing flow from between a vacuum vessel and a radiation shield to control the location of condensate film growth, the method comprising:

providing the cryopump of claim 1;

with the baffle recited in claim 1, redirecting gases traversing through the drain hole recited in claim 1 away from the non-primary second stage condensing surfaces; and condensing the gases directed at the primary second stage condensing surfaces to form frost.

9. The cryopump of claim 1, the second stage cryopumping surfaces further comprising:

protected surfaces having adsorbent.

* * * * *